(12) United States Patent
Tomosada et al.

(10) Patent No.: US 11,102,394 B2
(45) Date of Patent: Aug. 24, 2021

(54) CONTROL APPARATUS, IMAGING APPARATUS, AND STORAGE MEDIUM

(71) Applicant: CANON KABUSHIKI KAISHA, Tokyo (JP)

(72) Inventors: Toshihiko Tomosada, Kawasaki (JP); Hideyasu Hongu, Yokohama (JP); Atsushi Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/421,634

(22) Filed: May 24, 2019

(65) Prior Publication Data

US 2019/0373180 A1 Dec. 5, 2019

(30) Foreign Application Priority Data

May 30, 2018 (JP) .............................. JP2018-104017

(51) Int. Cl.
*H04N 5/232* (2006.01)
*G03B 13/00* (2021.01)

(52) U.S. Cl.
CPC ... *H04N 5/232122* (2018.08); *H04N 5/23216* (2013.01); *H04N 5/23245* (2013.01); *H04N 5/232125* (2018.08)

(58) Field of Classification Search
CPC ......... H04N 5/23212; H04N 5/232122; H04N 5/232125; H04N 5/23216; H04N 5/23245; G03B 13/36; G02B 7/34
See application file for complete search history.

(56) References Cited

U.S. PATENT DOCUMENTS

| 2012/0057062 A1 | 3/2012 | Hamada et al. |
| 2015/0022710 A1 | 1/2015 | Miyajima |

(Continued)

FOREIGN PATENT DOCUMENTS

| JP | 2002-107603 A | 4/2002 |
| JP | 2006-030475 A | 2/2006 |

(Continued)

OTHER PUBLICATIONS

The above patent documents were cited in a European Search Report dated Apr. 28, 2020, a copy of which is enclosed, that issued in the corresponding European Patent Application No. 19176925.6.

(Continued)

*Primary Examiner* — Kelly L Jerabek
(74) *Attorney, Agent, or Firm* — Cowan, Liebowitz & Latman, P.C.

(57) ABSTRACT

A control apparatus includes a focus detector configured to detect a defocus amount based on a phase difference between a pair of image signals generated based on light beams having passed through mutually different pupil areas in an imaging optical system, and a controller configured to control a focus lens in the imaging optical system. The controller is configured to perform an autofocus control based on the defocus amount detected by the focus detector, and a manual focus control based on an operation of a user via an operation member. The controller performs the autofocus control when a change amount relating to a speed of the focus lens in the manual focus control falls within a predetermined range.

31 Claims, 32 Drawing Sheets

(56) References Cited

U.S. PATENT DOCUMENTS

| | | | |
|---|---|---|---|
| 2015/0042867 A1* | 2/2015 | Shiono | G02B 7/38 348/348 |
| 2015/0316833 A1* | 11/2015 | Watanabe | H04N 5/232122 348/345 |
| 2015/0323760 A1* | 11/2015 | Tomosada | H04N 5/23212 250/201.2 |
| 2016/0191787 A1* | 6/2016 | Inagaki | H04N 5/3696 348/349 |
| 2016/0255267 A1 | 9/2016 | Takamiya | |
| 2017/0353680 A1* | 12/2017 | Fukuda | H04N 5/367 |
| 2018/0063412 A1* | 3/2018 | Uenishi | H04N 5/232122 |
| 2018/0152620 A1* | 5/2018 | Ito | G02B 7/36 |

FOREIGN PATENT DOCUMENTS

| | | |
|---|---|---|
| JP | 2007-155921 A | 6/2007 |
| JP | 2014-222291 A | 11/2014 |
| JP | 2016-218161 A | 12/2016 |

OTHER PUBLICATIONS

The above documents were cited in a Nov. 22, 2019 European Patent Office Partial Search Report, a copy of which is enclosed, that issued in European Patent Application No. 19176925.6.

* cited by examiner

DISPLAY IN CONTINUOUS MODE

DISPLAY IN STABLE MODE WITH MF
OPERATION PERMISSION FLAG OFF

DISPLAY IN STABLE MODE WITH MF
OPERATION PERMISSION FLAG ON

WHEN THERE IS NO PERSPECTIVE CONFLICT

WHEN THERE IS PERSPECTIVE CONFLICT

DEFOCUS AMOUNT IN FOCUS DETECTION
FRAME (CONVERTED INTO DEPTH OF FOCUS)

DEFOCUS AMOUNT IN FOCUS DETECTION
FRAME (CONVERTED INTO DEPTH OF FOCUS)

FRAME SIZE

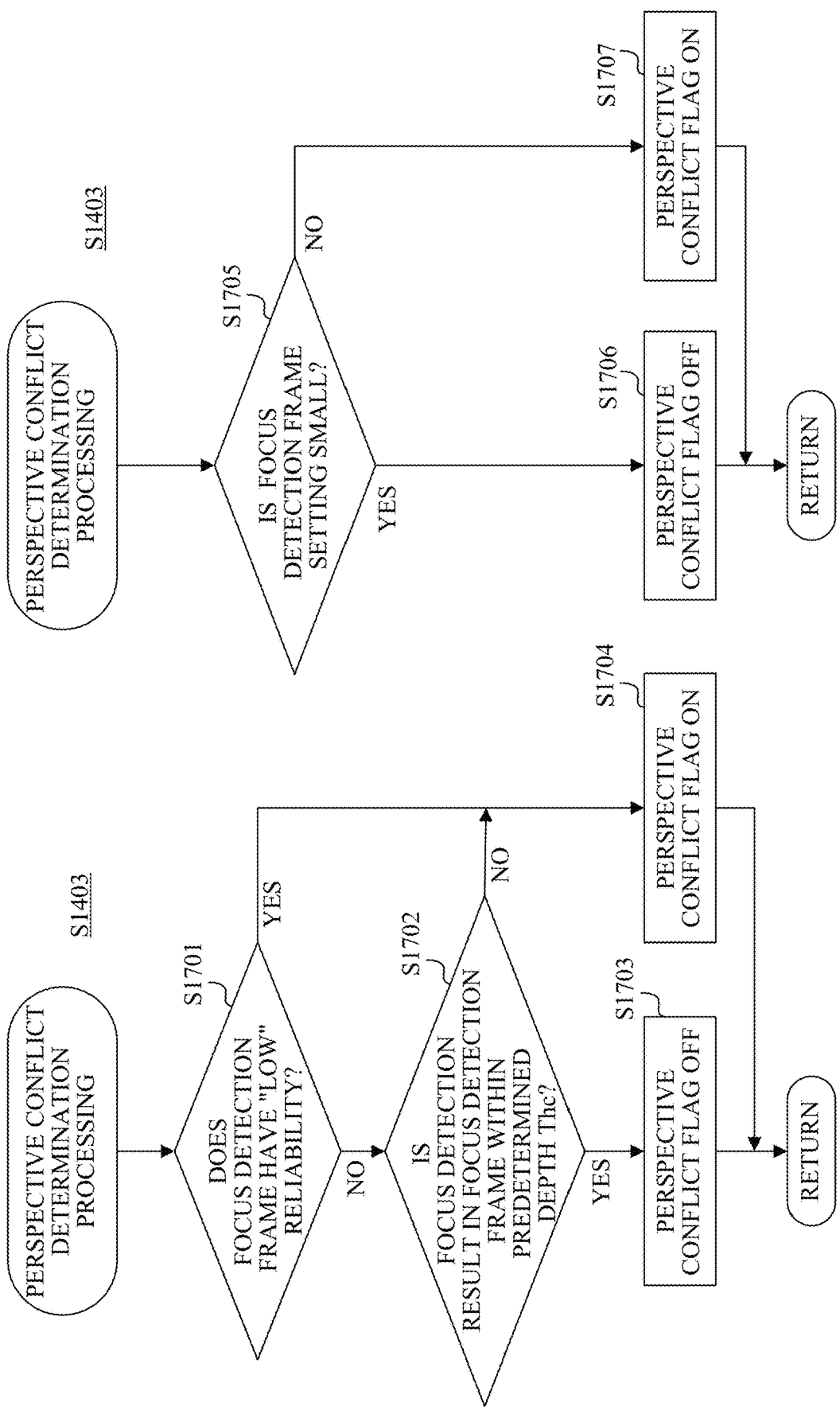

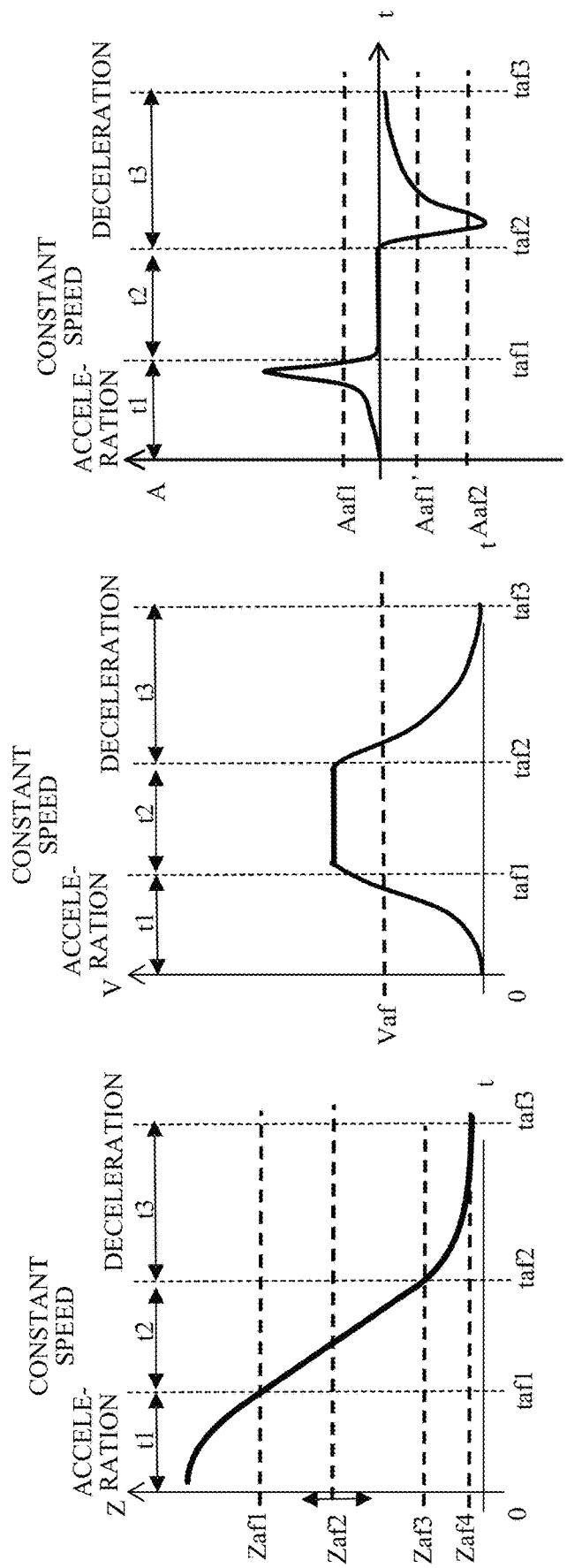

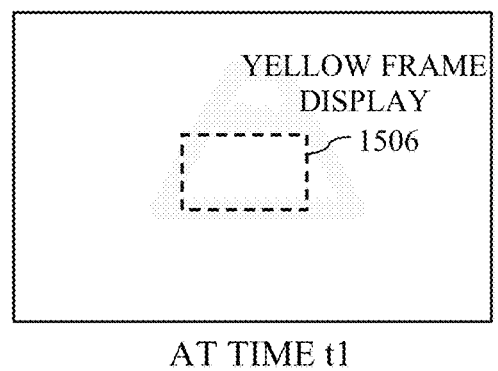
FIG. 26A  AT TIME t1
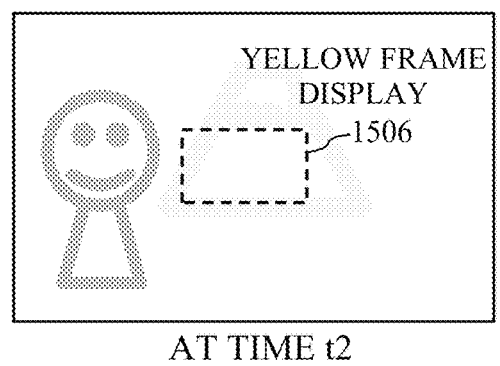
FIG. 26B  AT TIME t2
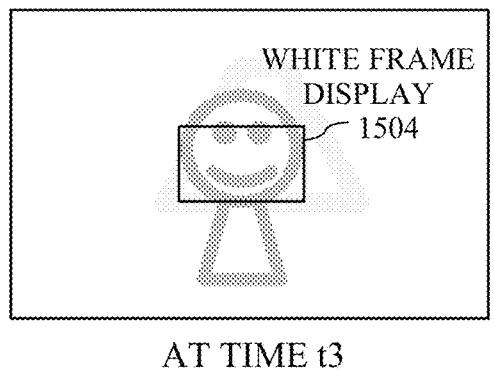
FIG. 26C  AT TIME t3
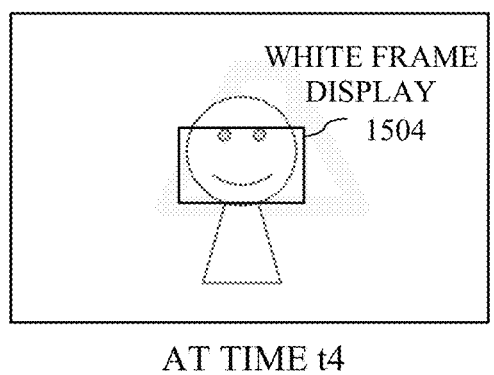
FIG. 26D  AT TIME t4

AT TIME t1

AT TIME t2

AT TIME t3

AT TIME t4

CHANGE OF DEFOCUS AMOUNT

CHANGE OF OBJECT DISTANCE

CONTROL APPARATUS, IMAGING APPARATUS, AND STORAGE MEDIUM

BACKGROUND OF THE INVENTION

Field of the Invention

The present invention relates to a control apparatus that controls focusing and an imaging apparatus having the same.

Description of the Related Art

One conventional imaging apparatus moves a focus lens to an in-focus position when a stop position of the focus lens shifts from the in-focus position in manual focusing. Japanese Patent Laid-Open No. ("JP") 2007-155921 discloses an imaging apparatus that obtains contrast evaluation values at a plurality of positions while driving the focus lens in manual focusing and calculates an in-focus position. The imaging apparatus disclosed in JP 2007-155921 moves the focus lens to the in-focus position when the stop position of the focus lens shifts from the in-focus position within a predetermined range.

In a scene in which a plurality of objects are mixed, another imaging apparatus focuses on an object intended by the user. JP 2006-30475 discloses an imaging apparatus configured to move a focus lens to an in-focus position based on a focus position change command that commands a moving direction of a focus lens unit from a manual focus unit in an autofocus mode. JP 2016-218161 discloses an imaging apparatus that detects a deceleration of a focus lens during a manual focus and switches the manual focus to an autofocus, in order to maintain a smooth change of a focusing state (focus state change) realized by the movement of the focus lens.

The imaging apparatus disclosed in JP 2007-155921 needs a temporary stop operation because the focus lens unit is moved to the in-focus position after its driving is stopped. Due to this stopping operation, it is difficult to capture an image with a smooth focus state.

The imaging apparatus disclosed in JP 2006-30475 can focus on the object intended by the manual focus operation by the user, even when the focusing operation is performed for the object different from the intention of the user. However, the driving speed of the focus lens unit fluctuates for each manual focus operation. It is thus difficult to capture an image with a smooth focus state change as in JP 2007-155921.

The imaging apparatus disclosed in JP 2016-218161 may cause a scene in which the smooth focus state becomes unstable because it may go by the in-focus position or start decelerating at a position apart from the in-focus position when it is difficult to specify the in-focus position, for example, for an object having a bad visibility or a deep depth of field.

The motion image capturing particularly requires the focus state change to be smooth and stable, but the prior art have the above problems and further improvements are demanded.

SUMMARY OF THE INVENTION

The present invention provides a control apparatus, an imaging apparatus, a program, and a storage medium or program, each of which can realize a smooth focus state change in manual focusing.

A control apparatus according to one aspect of the present invention includes a focus detector configured to detect a defocus amount based on a phase difference between a pair of image signals generated based on light beams having passed through mutually different pupil areas in an imaging optical system, and a controller configured to control a focus lens in the imaging optical system. The controller is configured to perform an autofocus control based on the defocus amount detected by the focus detector, and a manual focus control based on an operation of a user via an operation member. The controller performs the autofocus control when a change amount relating to a speed of the focus lens in the manual focus control falls within a predetermined range.

A control apparatus according to another aspect of the present invention includes a focus detector configured to detect a defocus amount based on a phase difference between a pair of image signals generated based on light beams having passed through mutually different pupil areas in an imaging optical system, and a controller configured to control a focus lens in the imaging optical system based on the defocus amount, and a memory configured to store a history of the defocus amount. The controller determines whether an object is moving in an in-focus direction, based on a change in the history of the defocus amount. The controller changes a control parameter in controlling the focus lens based on whether or not the object is moving in the in-focus direction.

A control apparatus according to another aspect of the present invention includes a focus detector configured to detect the defocus amount based on a phase difference between a pair of image signals generated based on light beams having passed through mutually different pupil areas in the imaging optical system, and a controller configured to control a focus lens in the imaging optical system. The controller can perform an autofocus control based on the defocus amount detected by the focus detector, and a manual focus control based on an operation of a user via an operation member. The controller sets a first defocus amount threshold when there is no operation of the user via the operation member, and sets a second defocus amount threshold larger than the first defocus amount threshold when there is an operation of the user via the operation member.

Further features of the present invention will become apparent from the following description of exemplary embodiments with reference to the attached drawings.

BRIEF DESCRIPTION OF THE DRAWINGS

FIGS. 17A and 17B are flowcharts showing the perspective conflict determination processing according to the first embodiment.

FIGS. 18A-18C are explanatory views of speed change calculation processing according to each embodiment.

FIGS. 26A to 26F are schematic views according to the first embodiment where it is determined that the object is not a moving object.

DESCRIPTION OF THE EMBODIMENTS

Referring now to the accompanying drawings, a description will be given of embodiments according to the present invention.

First Embodiment

<Configuration of Imaging Apparatus>

Figure 1:
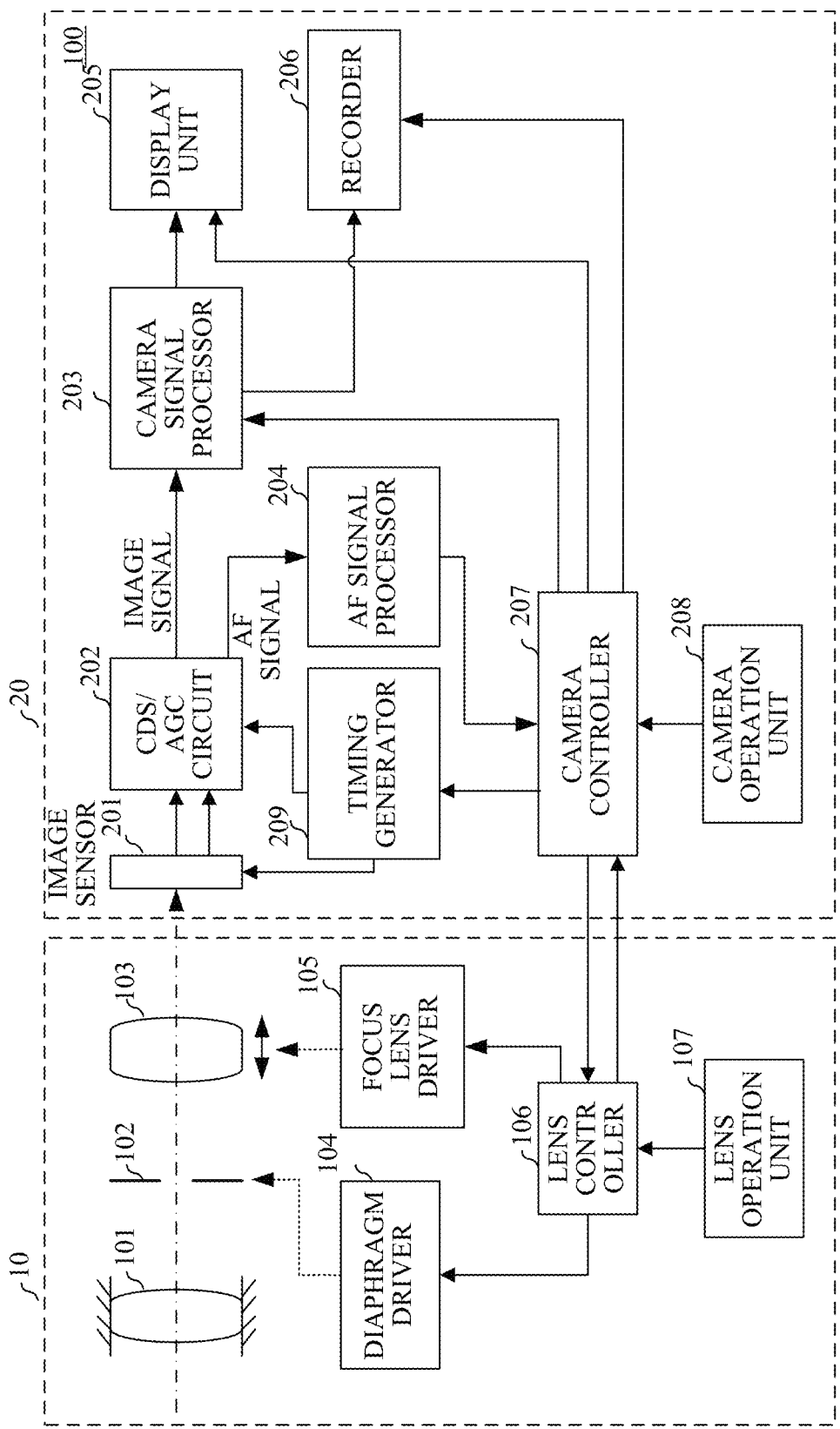
FIG. 1 is a block diagram of an imaging apparatus according to each embodiment.

Referring now to FIG. 1, a description will be given of an imaging apparatus 100 according to a first embodiment of the present invention. FIG. 1 is a block diagram of the imaging apparatus 100. The imaging apparatus 100 according to this embodiment is a lens interchangeable type camera including a camera body (imaging apparatus body) 20 and a lens unit (lens apparatus) 10 which is attachable to and detachable from the camera body 20. However, the present invention is not limited to this embodiment, and may be an imaging apparatus (a lens integrated camera) in which the camera body 20 and the lens unit 10 are integrated with each other.

In the imaging apparatus 100, the lens unit 10 has a lens controller 106 that controls the overall operation of the lens unit 10, and the camera body 20 has a camera controller 207 that controls the overall operation of the camera body 20. The lens controller 106 and the camera controller 207 exchange information with each other through a communication.

The lens unit 10 includes a fixed lens 101, a diaphragm (aperture stop) 102, a focus lens 103, an diaphragm driver 104, a focus lens driver 105, a lens controller 106, and a lens operation unit 107. The fixed lens 101, the diaphragm 102, and the focus lens 103 constitute an imaging optical system. The fixed lens 101 is a first lens unit having a plurality of fixed lenses. The diaphragm 102 is driven by the diaphragm driver 104, and adjusts a light amount incident on an image sensor 201, which will be described later. The focus lens 103 is driven by the focus lens driver 105 to adjust a focus imaged on the image sensor 201. A second lens unit for zooming may be provided in the imaging optical system.

The diaphragm driver 104 and the focus lens driver 105 are controlled by the lens controller 106, and change an aperture amount (aperture diameter) of the diaphragm 102 and the position of the focus lens 103. When the user operates the lens operation unit 107, the lens controller 106 controls the diaphragm driver 104 and the focus lens driver 105 based on the operation of the user. The lens controller 106 controls the diaphragm driver 104 and the focus lens driver 105 according to a control command and control information received from the camera controller 207 provided in the camera body 20, and sends control related information (lens control information) to the camera controller 207.

The camera body 20 acquires an image signal from a light beam that has passed through the imaging optical system (the fixed lens 101, the diaphragm 102, and the focus lens 103) in the lens unit 10. The camera body 20 includes an image sensor 201, a CDS (correlated double sampling)/AGC (automatic gain control) circuit 202, a camera signal processor 203, and an AF signal processor 204. The camera body 20 further includes a display unit 205, a recorder 206, the camera controller 207, the camera operation unit 208, and a timing generator 209.

In this embodiment, the AF signal processor (focus detector) 204 detects a defocus amount based on a phase difference between a pair of image signals generated based on light beams having passed through different pupil areas in the imaging optical system. The camera controller 207 controls the focus lens 103 based on the defocus amount detected by the AF signal processor 204 (performs an autofocus control). In this embodiment, the AF signal processor 204 and the camera controller 207 constitute a control apparatus.

The image sensor 201 includes a CCD sensor or a CMOS sensor, forms an image of a light beams having passed through the imaging optical system on a light receiving surface, and converts it into a signal charge corresponding to an incident light amount through a photodiode (photoelectrically converts the optical image formed through imaging optical system). The signal charge stored in each photodiode is sequentially read out of the image sensor 201 as a voltage signal corresponding to the signal charge based on a driving pulse from the timing generator 209 in accordance with an instruction from the camera controller 207.

Figures 2, 3:
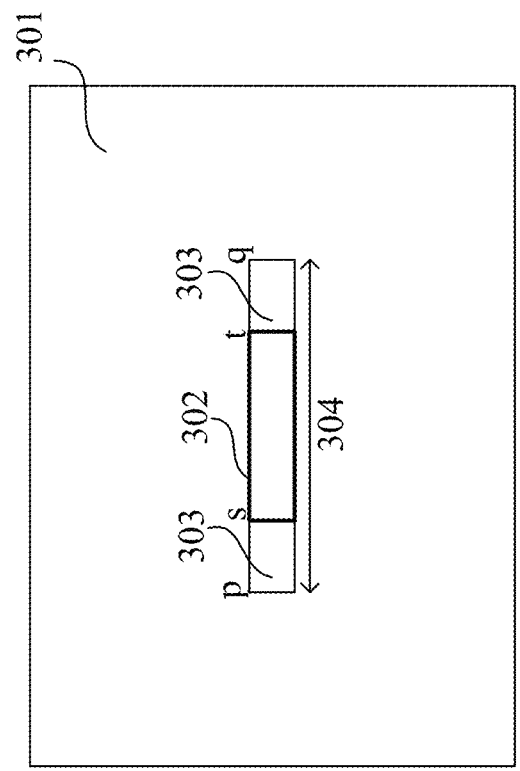
FIG. 2 is a pixel block diagram of an image sensor for imaging plane phase difference autofocus (AF) method according to each embodiment.
FIG. 3 is an explanatory view of a correlation calculation according to each embodiment.

FIG. 2 is a pixel configuration diagram of the image sensor 201 for the imaging plane phase difference AF method. As illustrated in FIG. 2, the image sensor 201 has two photodiodes in a single pixel for the imaging plane phase difference AF. In other words, the pixel 201a has photodiodes RA and RB, the pixel 201b has photodiodes GrA and GrB, the pixel 201c has photodiodes GbA and GbB, and the pixel 201d has photodiodes BA and BB.

FIG. 2 illustrates part of the light receiving surface of the image sensor 201. In each pixel in the image sensor 201, a light flux from the imaging optical system of the lens unit 10 is separated by a micro lens, and an image is formed on two photodiodes. Thereby, an image signal and an AF signal are generated. A signal (signal A+B) obtained by adding the signals from these two photodiodes to each other is an imaging signal (for imaging), and signals (signal A, signal B) of the photodiodes are two image signals (AF signals) for the imaging plane phase difference AF method. The AF signal processor 204 described later calculates the correlation between the two image signals based on the AF signal, and obtains a focus shift amount and various reliability information.

As illustrated in FIG. 1, the image signal and the AF signal read out of the image sensor 201 receives sampling and gain control processing in the CDS/AGC circuit 202. As a consequence, the image signal is output to the camera signal processor 203 and the AF signal is output to the AF signal processor 204.

The camera signal processor 203 generates an image signal by performing various types of image processing for the image signal output from the CDS/AGC circuit 202. The display unit 205 includes an LCD (Liquid Crystal Display) or the like, and displays the image signal output from the camera signal processor 203 as a captured image. The recorder 206 records the image signal from the camera signal processor 203 in a storage medium such as a magnetic tape, an optical disc, or a semiconductor memory.

An AF signal processor (focus detector) 204 calculates a correlation between the two image signals for the AF output from the CDS/AGC circuit 202, and calculates a defocus amount, a defocus direction, and reliability information. The reliability information includes, but is not limited to, a reliability of the defocus amount, a two-image coincidence degree, two-image steepness, contrast information, saturation information, flaw information, and the like. The AF signal processor 204 outputs the calculated defocus amount, defocus direction, and reliability information to the camera controller 207. On the other hand, based on the defocus amount, the defocus direction, and the reliability information acquired from the AF signal processor 204, the camera controller 207 notifies the AF signal processor 204 of a setting change for calculating them. The details of the correlation calculation will be described later with reference to FIGS. 3 to 9.

In this embodiment, a total of three signals including an imaging signal and two image signals for the AF are taken out of the image sensor 201, but the present invention is not limited to this embodiment. By considering the load of the image sensor 201, for example, a total of two signals including one image signal and one image signal for the AF may be taken out, a difference between the image signal and the AF signal may be calculated in the AF signal processor 204 etc., and another image signal for the AF may be generated.

The camera controller 207 exchanges information with each component in the camera body 20 for a variety of controls. The camera controller 207 performs a variety of camera functions, such as power on/off, the setting change, a start of recording, a start of the AF control, and a confirmation of a recorded image. according to the input of the user to the camera operation unit 208. As described above, the camera controller 207 exchanges information with the lens controller 106 in the lens unit 10, sends a control command and control information on the lens unit 10, and acquires various information on the lens unit 10.

Although details will be described later, the camera controller 207 can execute a first mode and a second mode. In the first mode, the camera controller 207 drives the focus lens 103 to automatically continue an in-focus control (autofocus control) on the object. In the second mode, the camera controller 207 stops the focus lens 103 when the defocus amount falls within a predetermined depth and the reliability (reliability information) is high. In the second mode, when the defocus amount is located out of the predetermined depth or the reliability is low, the camera controller 207 instructs the focus lens 103 to perform or stop the focus drive based on the defocus amount and the reliability.

Herein, in the in-focus operation, the camera controller 207 sends a control signal to the lens controller 106, and in response the lens controller 106 controls the focus lens driver 105 for the in-focus operation. Therefore, hereinafter, when the camera controller 207 drives the focus lens 103, the camera controller 207 controls driving the focus lens 103 via the lens controller 106 and the focus lens driver 105.

Referring now to FIGS. 3 to 9, a description will be given of the correlation calculated by the AF signal processor 204. FIG. 3 is an explanatory view of the correlation calculation, and illustrates an illustrative area for acquiring an image signal as a focus detection range handled in the focus detection processing. FIG. 3 illustrates the focus detection range on the pixel array of the image sensor 201, and illustrates a pixel array 301, a focus detection area 302, and a shift area 303 necessary for the correlation operation in the image sensor 201. FIG. 3 illustrates an area 304 necessary for the correlation calculation that combines the focus detection area 302 and the shift area 303. In FIG. 3, p, q, s, and t indicate coordinates in the x-axis direction, coordinates p to q indicate the area 304, and coordinates s to t indicate the focus detection area 302.

Figure 4A:
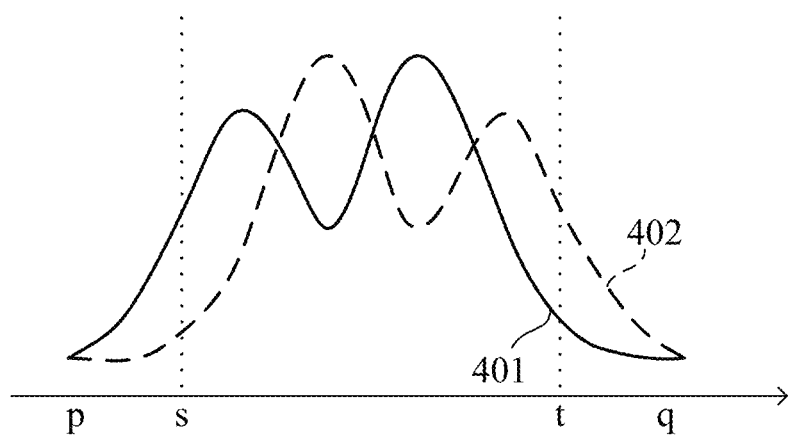
FIGS. 4A to 4C are graphs of waveform examples of image signals according to each embodiment.
Figure 4B:
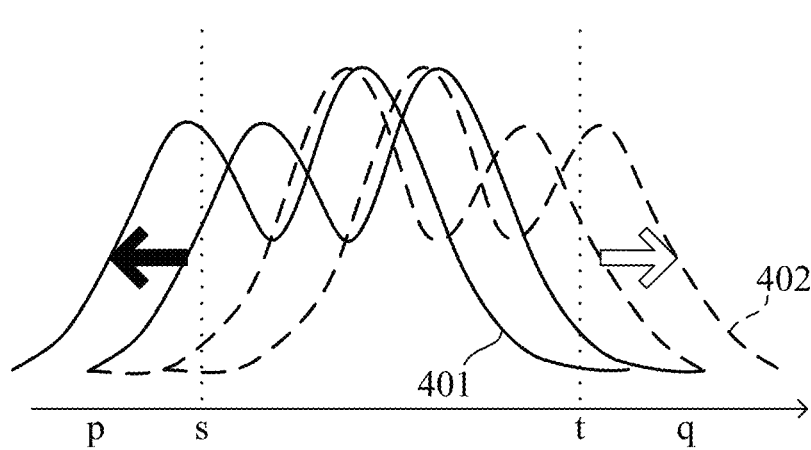
Figure 4C:
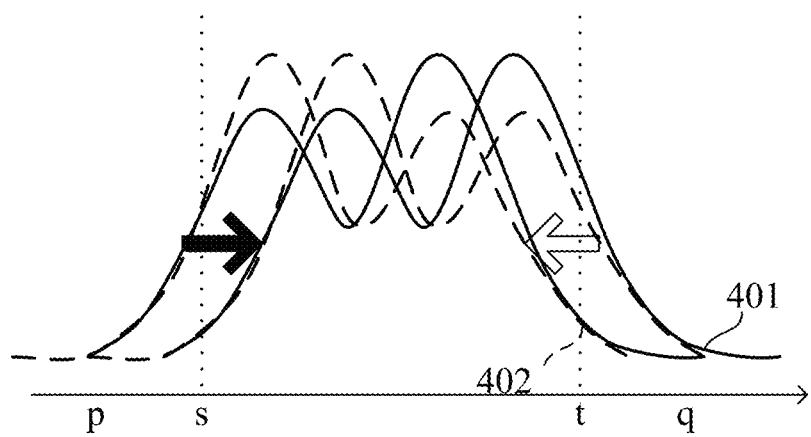

FIGS. 4A to 4C are graphs of waveform examples of the image signals, and illustrate waveform examples of the two image signals (AF signals) acquired from the focus detection area 302 set in FIG. 3. In FIG. 4A-4C, coordinates s to t represent the focus detection area relating to the focus detection area 302, and p to q represent an area necessary for the focus detection calculation based on the shift amount relating to the shift area 304.

FIG. 4A illustrates pre-shift waveforms of the image signals, in which a solid line 401 denotes a waveform relating to the image signal A. and a broken line 402 denotes a waveform relating to the image signal B. FIG. 4B is made by shifting the pre-shift waveforms of the image signals A and B illustrated in FIG. 4A in the plus direction. FIG. 4C is made by shifting the pre-shift waveforms of the image signals A and B illustrated in FIG. 4A in the minus direction. When the correlation calculation in this embodiment calculates a correlation amount between the image signals A and B, the waveforms 401 and 402 relating to the image signals A and B are shifted by one bit in the arrow directions illustrated in FIGS. 4B and 4C.

Next follows a description of a method of calculating a correlation amount COR. First, as described with reference to FIGS. 4B and 4C, the image signals A and B are shifted every bit, and the sum of the absolute values of the difference between the image signals A and B at that time is calculated. Then, when the shift amount is represented by i, a minimum shift amount is p-s in FIGS. 4A to 4C and a maximum shift amount is q-t in FIGS. 4A to 4C. Therefore, the shift amount I is located in the range of (p-s)<i<(q-t). Assume that a start coordinate of the focus detection area is x, an end coordinate of the focus detection area is y, and k=x to y. Then, the correlation amount COR[i] according to the shift amount i can be calculated by the following expression (1).

$$COR[i] = \sum_{k=x}^{y} |A[k+i] - B[k-i]| \quad (1)$$

$$\{(p-s) < i < (q-t)\}$$

Figure 5:
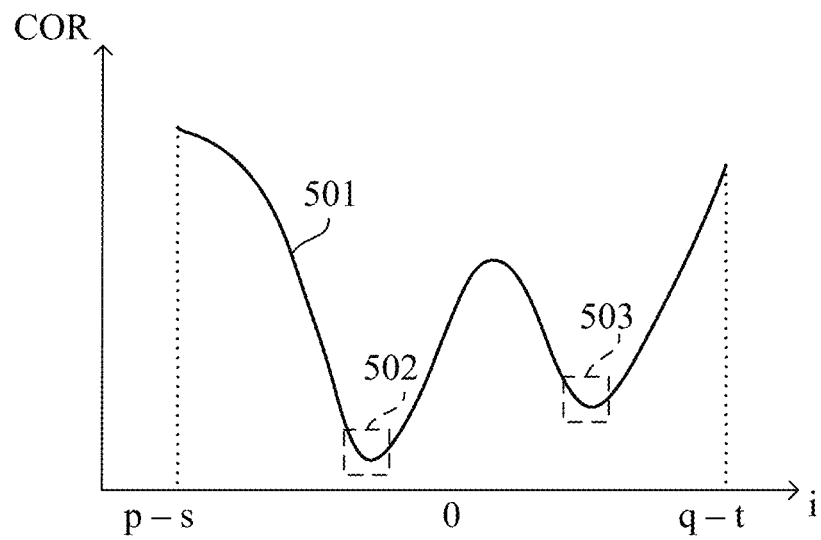
FIG. 5 is a graph of a waveform example of a correlation amount according to each embodiment.

FIG. 5 is a graph showing a wavelength example of the correlation amount COR. The abscissa axis of the graph is the shift amount i, and the ordinate axis is the correlation amount COR. In FIG. 5, reference numeral 501 denotes a correlation amount waveform, and reference numerals 502 and 503 denote ranges containing the minimum values of the correlation amount waveform 501. Among them, the smaller the correlation amount COR is, the higher the coincidence degree between the A image and the B image is.

Next follows a description of a method of calculating the correlation change amount ΔCOR. First, the correlation change amount ΔCOR is calculated by taking a difference (or COR[i−1]−COR[i+1]) between the alternate correlation amounts COR in the correlation amount waveform 501 in FIG. 5. The minimum shift number is p-s in FIG. 5, and the maximum shift number is q-t in FIG. 5. Using them, the correlation change amount ΔCOR[i] according to the shift amount i can be calculated by the following expression (2).

$$\Delta COR[i] = COR[i-1] - COR[i+1]$$

$$\{(p-s+)<i<(q-t-1)\} \quad (2)$$

Figure 6:
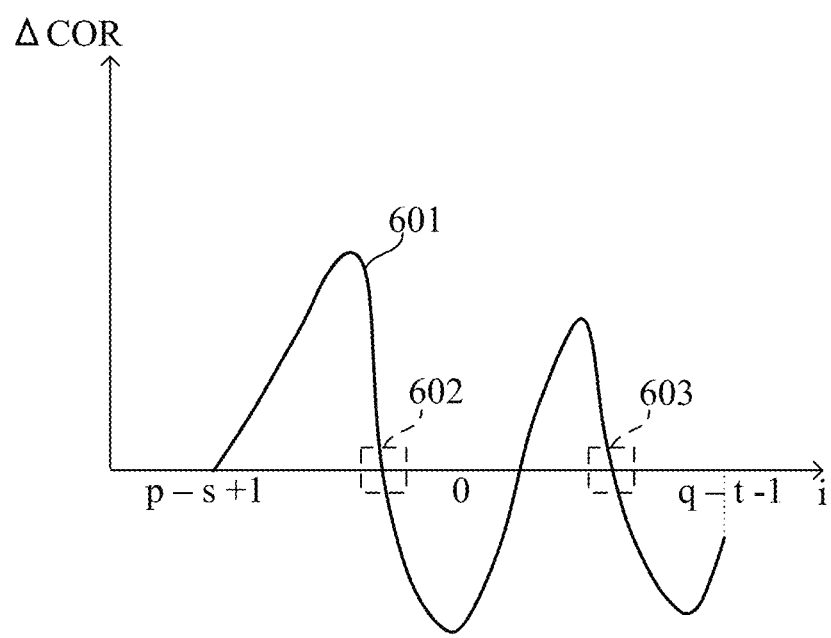
FIG. 6 is a graph of a waveform example of a correlation change amount according to each embodiment.

FIG. 6 is a graph showing a wavelength example of the correlation change amount ΔCOR of the correlation amount COR (waveform 501) illustrated in FIG. 5. The abscissa axis of the graph is the shift amount i, and the ordinate axis is the correlation change amount ΔCOR. In FIG. 6, reference numeral 601 denotes a waveform of the correlation change amount ΔCOR according to the shift amount i, and reference numerals 602 and 603 denote ranges in which the correlation change amount ΔCOR changes from plus to minus. The correlation change amount ΔCOR of 0 indicated by reference numeral 602 is called a zero cross, the coincidence degree between the A and B images becomes the highest, and the shift amount i at that time is the focus shift amount. The correlation change amount ΔCOR of 0 indicated by reference numeral 603 is also called a zero cross. In the example in FIG. 6, there are a plurality of zero crosses, and this case will be described later.

Figure 7:
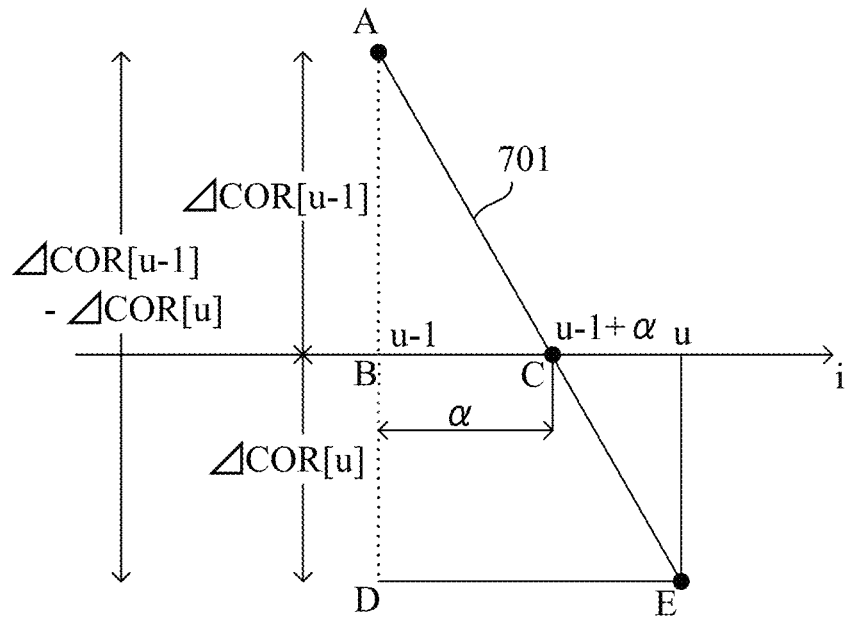
FIG. 7 is an explanatory view of a focus shift amount according to each embodiment.

FIG. 7 is an enlarged graph near the reference numeral 602 of the waveform 601 of the correlation change amount ΔCOR in FIG. 6 where reference numeral 701 is part of the waveform 601 relating to the correlation change amount ΔCOR A method of calculating a focus shift amount PRD will now be described.

First, the focus shift amount PRD is a value of the shift amount i at the zero cross (point C) in FIG. 7 and is divided into integral part β and fractional part α, i.e., PRD=β+α. The integer part β is β=u−1 from FIG. 7, where u is a value obtained by adding 1 to the integer part of the shift amount i at the zero cross (point C). The fractional part α can be calculated by the following expression (3) from the similarity relationship between a triangle ABC and a triangle ADE in FIG. 7.

$$AB:AD = BC:DE \rightarrow \Delta COR[u-1]:\Delta COR[u-1] - \Delta COR[u] = \quad (3)$$

$$\alpha:u - (u-1) \rightarrow \alpha = \frac{\Delta COR[u-1]}{\Delta COR[u-1] - \Delta COR[u]}$$

As described above, the focus shift amount PRD can be calculated from the sum of α and β. When there are a plurality of zero crosses as illustrated in FIG. 6, the steepness maxder (referred to as "steepness" hereinafter) of the correlation amount change at the zero cross (length AD in the example of FIG. 7) is the largest value is set to the first zero cross. The steepness is an index indicating the ease of the AF, and indicates that the larger the value is, the easier the AF is at the point. The steepness maxder can be calculated by the following expression (4).

$$\max der = |\Delta COR[u-1]| + |\Delta COR[u]| \quad (4)$$

As described above, when there are a plurality of zero crosses, each steepness is calculated, the zero cross having the largest steepness is determined as the first zero cross, and the focus shift amount PRD is calculated for the first zero cross.

Next follows a description of a method of calculating the reliability of the focus shift amount PRD. The reliability of the focus shift amount PRD can be defined by the above steepness and the two-image coincidence degree fnclvl between the image signals A and B (referred to as "two-image coincidence" hereinafter). The two-image coincidence degree fnclvl is an index that represents the accuracy of the focus shift amount PRD, and the smaller the value is, the better the accuracy is.

Figure 8:
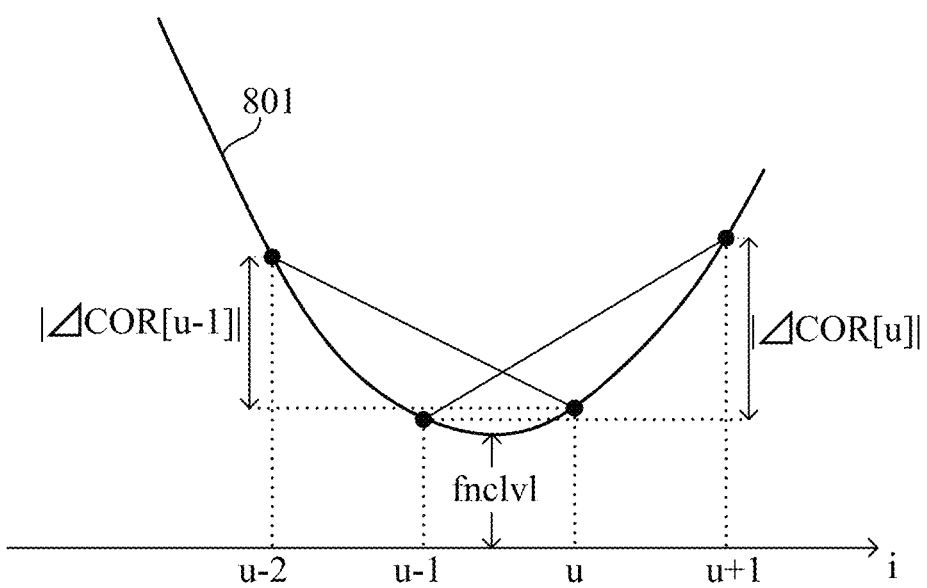
FIG. 8 is an explanatory diagram of a two-image coincidence degree calculating method according to each embodiment.

FIG. 8 is an explanatory diagram of a method of calculating the two-image coincidence degree. FIG. 8 corresponds to a graph enlarging the portion indicated by reference numeral 502 in FIG. 5, and reference numeral 801 denotes a portion indicated by reference numeral 502 in the correlation amount waveform 501. The two-image coincidence degree fnclvl can be calculated by the following expression (5)

$$(i) |\Delta COR[u-1]| \times 2 \leq \max der$$

$$fnclvl = COR[u-1] + \Delta COR[u-1]/4$$

$$(ii) |\Delta COR[u]-1| \times 2 > \max der$$

$$fnclvl = COR[u] - \Delta COR[u]/4 \quad (5)$$

Figure 9:
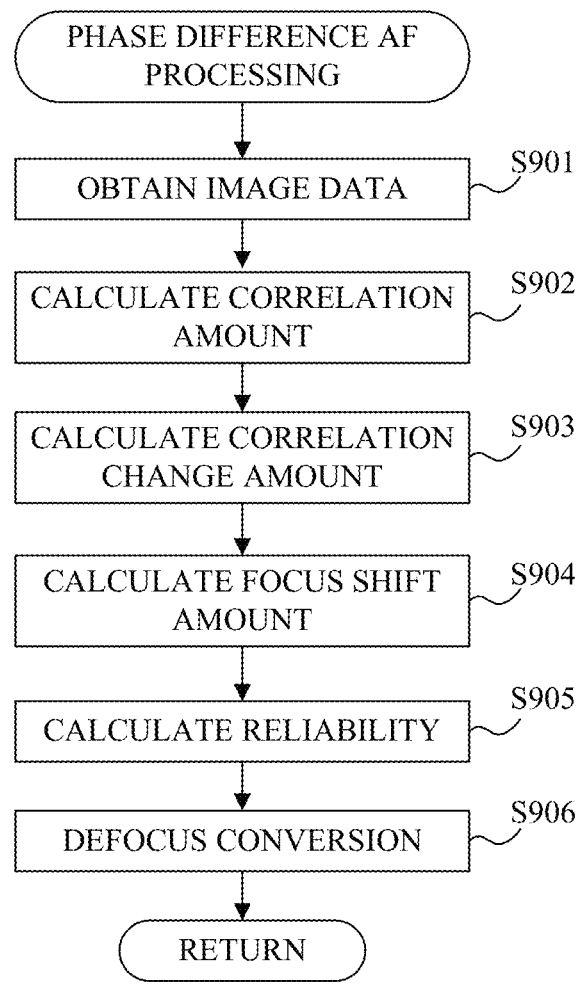
FIG. 9 is a flowchart showing a calculation of a defocus amount according to each embodiment.

FIG. 9 is a flowchart showing the calculation of the defocus amount (phase difference AF processing). Each step in FIG. 9 is mainly executed by the AF signal processor 204 based on an instruction from the camera controller 207.

First, in the step S901, the AF signal processor 204 acquires, from the CDS/AGC circuit 202, image data relating to the image signals A and B from the arbitrarily set focus detection area 302 for the image sensor 201. Next, in the step S902, the AF signal processor 204 calculates a correlation amount COR[i] according to the shift amount i from the image data acquired in the step S901. Next, in the step S903, the AF signal processor 204 calculates the correlation change amount ΔCOR[i] based on the correlation amount COR[i] calculated in the step S902.

Next, in the step S904, the AF signal processor 204 calculates the focus shift amount PRD (=β+α) from the shift amount i at the zero cross of the correlation change amount ΔCOR[i] calculated in the step S903. Next, in the step S905, the AF signal processor 204 calculates the reliability (reliability information) indicating how reliable the defocus amount PRD calculated in the step S904 is. The AF signal processor 204 performs the processing for each focus detection area 302.

Next, in the step S906, the AF signal processor 204 converts the focus shift amount PRD into a defocus amount for each focus detection area 302. The focus shift amount PRD and the defocus amount normally have a proportional relationship (see JP 2014-222291). Thus, the AF signal processor 204 may convert the defocus amount PRD into the defocus amount based on the proportional relationship previously stored in a nonvolatile memory (not shown).

<AF Control Processing>

Figure 10:
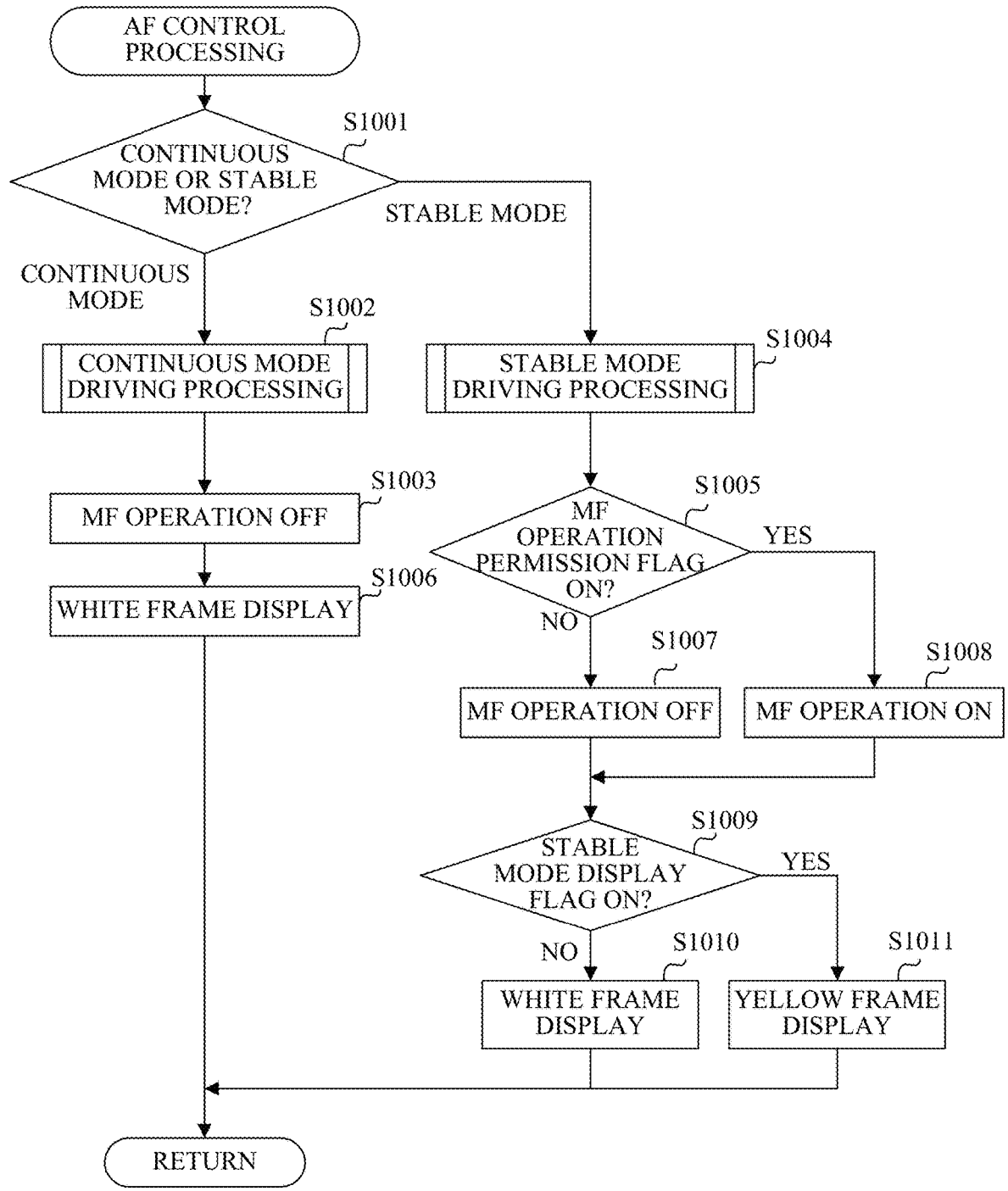
FIG. 10 is a flowchart of autofocus (AF) control processing according to each embodiment.

Referring now to FIG. 10, a description will be given of the AF control process executed by the camera controller 207. FIG. 10 is a flowchart showing the AF control processing performed by the camera controller 207. The AF control processing is executed in accordance with a computer program stored in the camera controller 207 or a ROM (not shown) provided in the imaging apparatus 100 or the like. The AF control processing is repeatedly performed, for example, whenever an image signal from the image sensor 201 for generating a one-field image is read out.

First, in the step S1001, the camera controller 207 determines the AF mode relating to the focusing operation set by the user, based on the information from the lens operation unit 107 received through the lens controller 106. More specifically, the camera controller 207 determines whether the AF mode is the continuous mode (first mode) or the stable mode (second mode). If the AF mode is the continuous mode, the flow proceeds to the step S1002. On the other hand, when the AF mode is the stable mode, the flow proceeds to the step S1004.

The "continuous mode" is a mode in which the imaging apparatus 100 automatically and continuously searches for an object based on the defocus amount, the defocus direction, and the reliability information calculated by the AF signal processor 204, and automatically and continuously focuses on the object (or performs the autofocus control). The "stable mode" is a mode which keeps focusing on the object only when the defocus amount, the defocus direction, and the reliability information calculated by the AF signal processor 204 satisfy the predetermined condition. The predetermined condition will be described later. The user can set the continuous mode (first mode) or the stable mode (second mode) as the AF mode by operating the lens operation unit 107.

In the step S1002, the camera controller 207 performs continuous mode driving processing. The details of the step S1002 will be described later. Next, in the step S1003, the camera controller 207 refuses (turns off) the manual focusing operation (manual focus control, MF operation). Next, in the step S1006, the camera controller 207 displays the focus frame displayed on the display unit 205 as a white frame to indicate to the user that the lens driving processing is being performed.

In the step S1004, the camera controller 207 performs the stable mode driving processing. The details of the step S1004 will be described later. Next, in the step S1005, the camera controller 207 determines whether an MF operation permission flag described later is turned on. If the MF operation permission flag is turned off (No in the step S1005), the camera controller 207 proceeds to the step S1007 and turns off (refuses) the MF operation. On the other hand, when the MF operation permission flag is turned on (Yes in the step S1005), the camera controller 207 proceeds to the step S1008 and turns on (permits) the MF operation.

Next, in the step S1009, the camera controller 207 determines whether the stable mode display flag is turned on. If the stable mode display flag is turned on (Yes in the step S1009), the flow proceeds to the step S1011 and the camera controller 207 displays a yellow focus frame displayed on the display unit 205. On the other hand, if the stable mode display flag is turned off (No in the step S1009), the flow proceeds to the step S1010, and the camera controller 207 displays the white focus frame displayed on the display unit 205.

The MF operation permission flag set in the steps S1007 and S1008 is a flag indicating the lens driving state in the lens driving processing in the stable mode described later. For example, when the lens driving is temporarily stopped, the MF operation permission flag is set to ON.

Figure 15A:
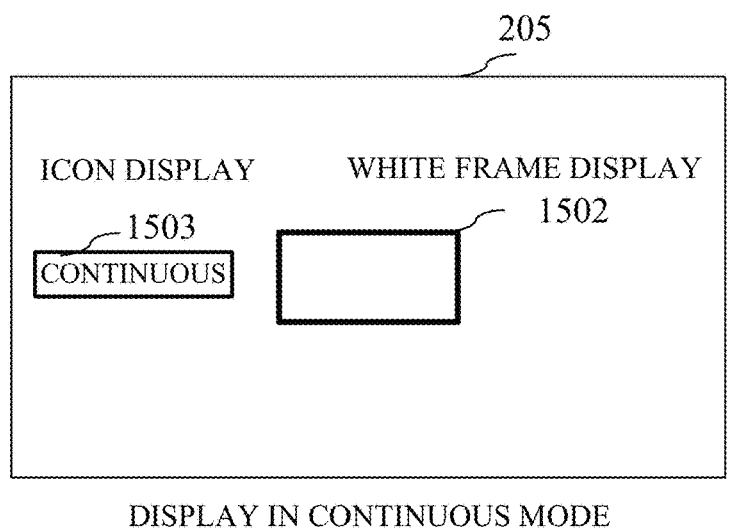
FIGS. 15A-15C are schematic views of screen display examples according to each embodiment.
Figure 15B:
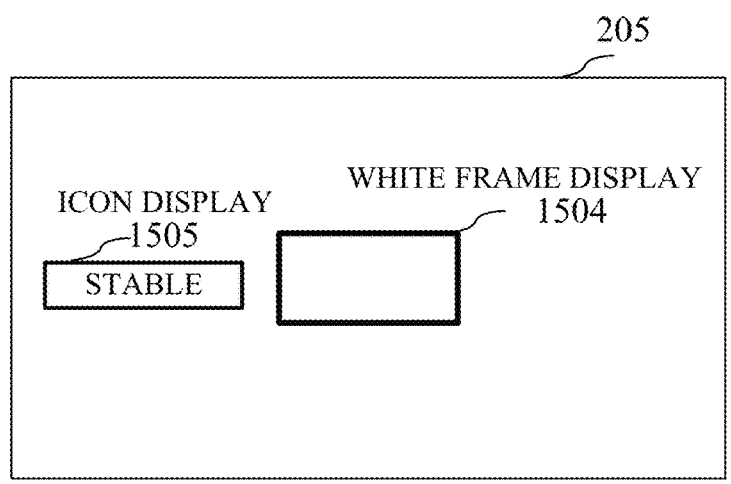
Figure 15C:
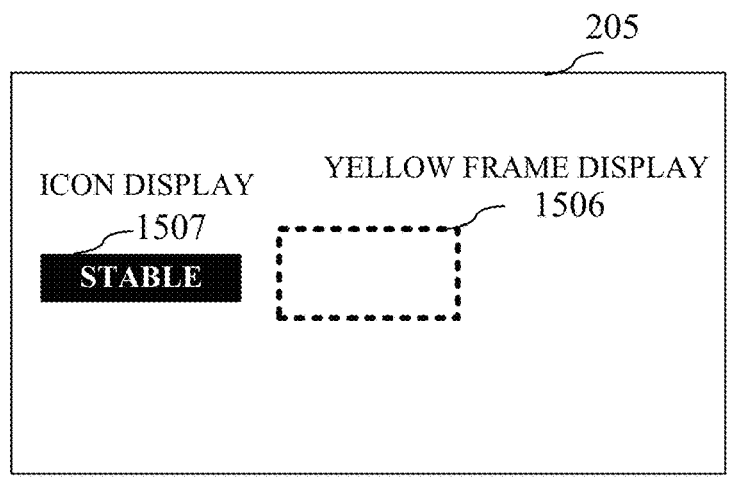

The user may be notified by the display of the display unit 205 of whether the lens driving processing in the stable mode, which will be described later, is being performed or the lens driving processing is stopped. FIGS. 15A to 15C are schematic views of image display examples. For example, as illustrated in FIGS. 15A-15C, the display unit 205 displays white frame displays 1502 and 1504 and yellow frame display 1506 relating to the focus frame and icon displays 1503, 1505, and 1507 relating to the AF mode. In the continuous mode or the stable mode, when the stable mode display flag is OFF and lens driving processing is being performed, the focus frame display is changed to the white frame displays 1502 and 1504. On the other hand, when the defocus amount out of the predetermined range is calculated, the focus frame display may be set to the yellow frame display 1506.

By making the icon displays 1505 and 1507 different from each other, the user may be notified of the difference between the ON and OFF of the MF operation permission flag in the stable mode. Thereby, the user can determine whether the lens driving processing is being performed (the stable mode display flag is OFF) or the lens driving processing is temporarily stopped (the stable mode display flag is ON). When the user can determine when the imaging apparatus 100 is ready to search for an object for autofocusing, or focusing is stopped and the user intends to manually focus on the object.

If the manual focusing is necessary, the MF operation is turned on (permitted) (step S1008). Whether the AF mode is the continuous mode (icon display 1503) or the stable mode (icon displays 1505 and 1507) may be indicated by an icon display of the display unit 205. The display described above is not limited to this example as long as the user can determine the type of AF mode and the ON/OFF of the MF operation permission flag, and a method other than the display, such as a voice notice, may be used.

Figure 11:
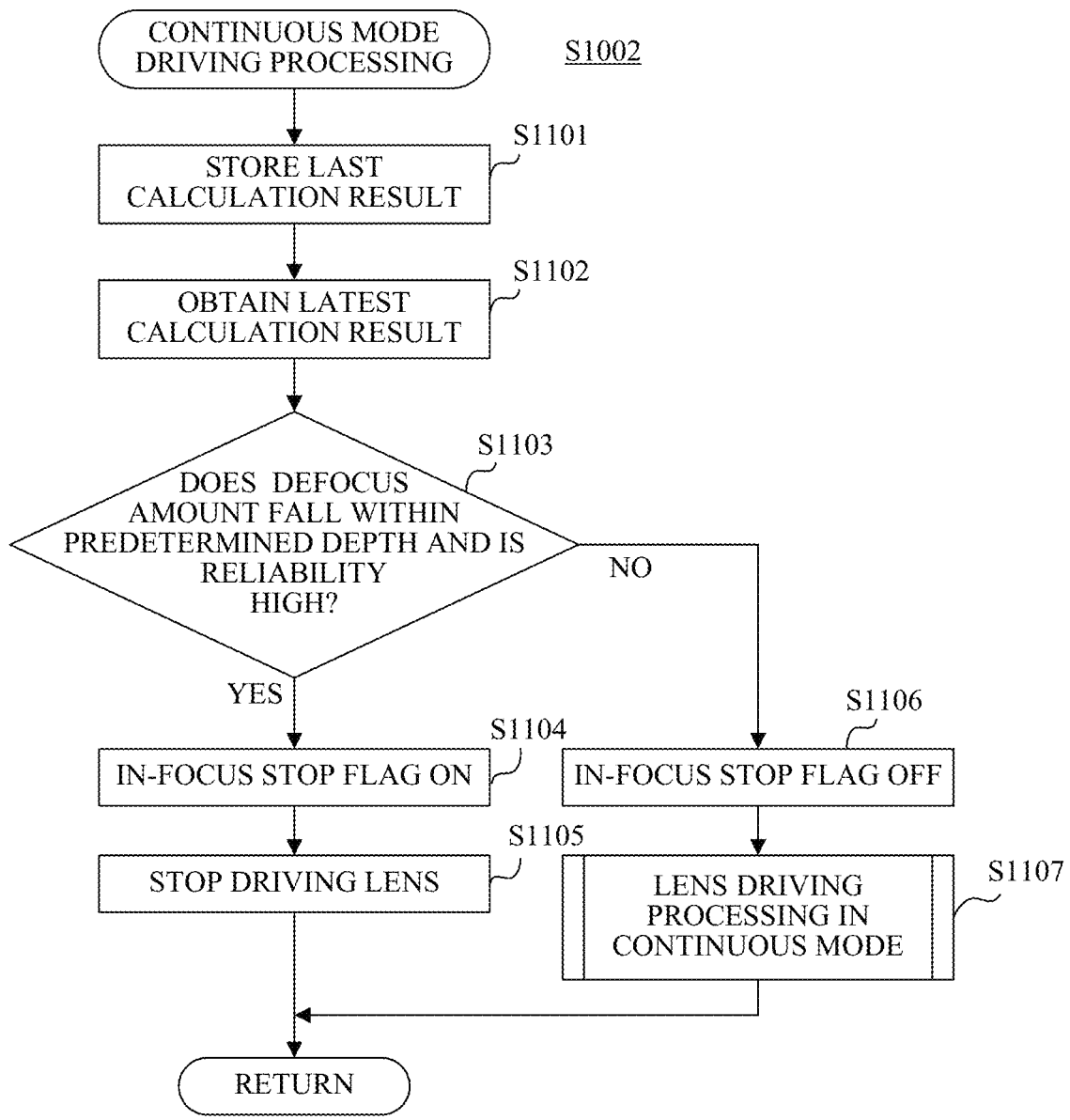
FIG. 11 is a flowchart showing driving processing in a continuous mode according to each embodiment.

Referring now to FIG. 11, a description will be given of the continuous mode driving processing (step S1002). FIG.

11 is a flowchart showing the continuous mode driving processing. Each step in FIG. 11 is mainly executed by the camera controller 207.

First, in the step S1101, the camera controller 207 stores in a nonvolatile memory (not shown) provided in the imaging apparatus 100 the last calculation result (defocus amount, defocus direction, and reliability information) acquired from the AF signal processor 204. This embodiment provides an area, such as a ring buffer, to save the history of a plurality of calculation results, and in storing the last calculation result, earlier calculation results are shifted and stored but the present invention is not limited to this example. Next, in the step S1102, the camera controller 207 acquires the latest calculation result from the AF signal processor 204.

Next, in the step S1103, the camera controller 207 determines whether the defocus amount falls within the predetermined depth and the reliability of the defocus amount (reliability information) is "high," based on the calculation result acquired from the AF signal processor 204 in the step S1102. If the defocus amount falls within the predetermined depth and the reliability is "high" (Yes in the step S1103), the flow proceeds to the step S1104 and the camera controller 207 sets the focus stop flag to ON. Next, in the step S1105, the camera controller 207 stops driving of the focus lens 103, and ends the processing. On the other hand, if the defocus amount does not fall within the predetermined depth or the reliability is not "high" (No in the step S1103), the flow proceeds to the step S1106 and the camera controller 207 sets the focus stop flag to OFF.

The reliability of the defocus amount is determined "high" by the AF signal processor 204 when the accuracy of the defocus amount and the defocus direction are reliable. When the accuracy of the defocus amount is low but the defocus direction is reliable, it is determined "medium." The reliability of the defocus amount is "high" when the main object is almost focused or when the main object is already in the in-focus state. In this case, the camera controller 207 relies on the defocus amount from the AF signal processor 204 and drives the focus lens 103 for focusing.

The defocus amount has a "medium" reliability when the accuracy of the defocus amount is low because only the two-image coincidence degree of the reliability information from the AF signal processor 204 is lower than a predetermined value but the defocus direction is reliable and the image of the main object is slightly blurred. For the "medium" reliability of the defocus amount, the camera controller 207 does not rely on the defocus amount and performs search driving. The search driving is to drive the focus lens 103 by a predetermined amount in a predetermined direction without using the defocus amount from the AF signal processor 204 so as to search for an object. As described above, the start direction of the search driving is set to the defocus direction acquired from the AF signal processor 204.

If the accuracy of the defocus amount is low and the defocus direction is unreliable, the reliability of the defocus amount is determined "low." The "low" reliability of the defocus amount occurs, for example, when the object is significantly blurred, and the defocus amount cannot be correctly calculated. In this case, the search driving is performed without relying on the defocus amount. The search driving start direction is set to, for example, a direction far from the lens end without using the defocus direction from the AF signal processor 204. The reliability determination of the defocus amount ("high, medium, low") described herein is not limited to the above example.

If the defocus amount does not fall within the predetermined depth or the reliability of the defocus amount is not "high," the camera controller 207 sets the focus stop flag to OFF in the step S1106. Next, in the step S1107, the camera controller 207 performs the lens driving processing in the continuous mode described later, and ends the processing.

Figure 12:
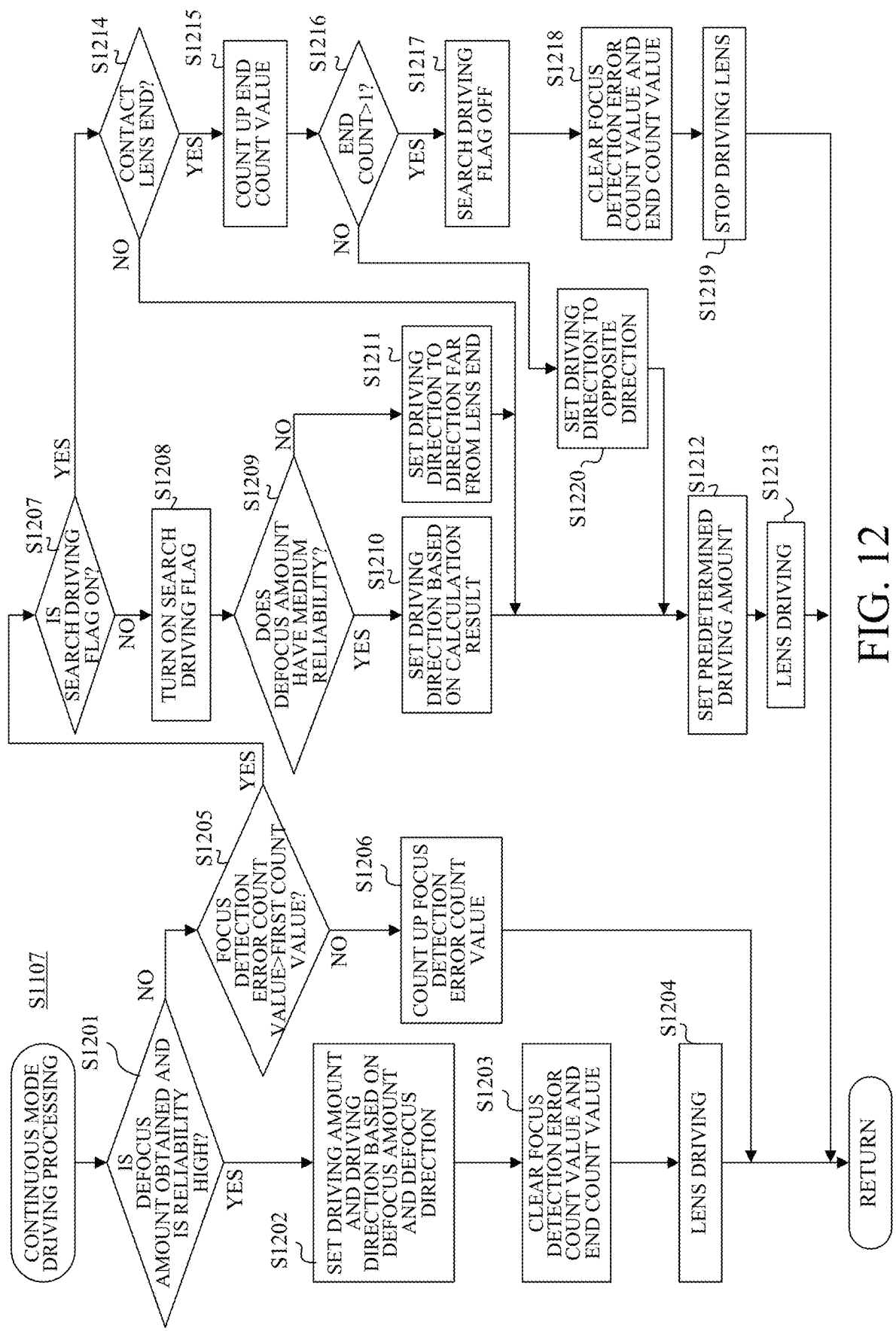
FIG. 12 is a flowchart showing lens driving processing in the continuous mode according to each embodiment.

Referring now to FIG. 12, a description will be given of the lens driving processing (step S1107) in the continuous mode. FIG. 12 is a flowchart showing the lens driving processing in the continuous mode. Each step in FIG. 12 is mainly executed by the camera controller 207.

First, in the step S1201, the camera controller 207 determines whether the defocus amount obtained from the AF signal processor 204 does not fall within the predetermined depth in the step S1103 and the reliability is "high." If the defocus amount outside the predetermined depth is obtained and the reliability is "high" ("Yes" in the step S1201), the camera controller 207 proceeds to the step S1202. In the step S1202, the camera controller 207 sets the driving amount and driving direction of the focus lens 103 based on the obtained defocus amount and defocus direction. Next, in the step S1203, the camera controller 207 clears the focus detection error count value and the end count value. Next, in the step S1204, the camera controller 207 drives the focus lens 103 based on the driving amount and driving direction set in the step S1202, and ends the processing.

On the other hand, when the defocus amount is not obtained in the step S1201 or when the reliability is not "high" (No in the step S1201), the camera controller 207 proceeds to the step S1205. In the step S1205, the camera controller 207 determines whether the focus detection error count value is larger than a first count value. Herein, the first count value is a value previously stored in a nonvolatile memory (not shown) provided in the imaging apparatus 100.

If the focus detection error count value is not larger than the first count value in the step S1205 (No in the step S1205), the flow proceeds to the step S1206. In the step S1206, the camera controller 207 counts up (increments) (+1) the focus detection error count value, and ends the processing.

On the other hand, when the focus detection error count value is larger than the first count value in the step S1205 (Yes in the step S1205), the camera controller 207 proceeds to the step S1207. In the step S1207, the camera controller 207 determines whether a search driving flag described later is ON. When the search driving flag is ON (Yes in the step S1207), since the search driving has already been executed, the camera controller 207 continuously executes the last lens driving.

In the step S1214, the camera controller 207 determines whether the focus lens 103 has been driven for searching and has reached the lens end. If the focus lens 103 is located at the lens end (Yes in the step S1214), the flow proceeds to the step S1215. In the step S1215, the camera controller 207 counts up (increments) (+1) the end count value.

Next, in the step S1216, the camera controller 207 determines whether the end count value is larger than 1 (or equal to 2 or more). When the end count value is larger than 1 (Yes in the step S1216), the camera controller 207 cannot acquire a reliable defocus amount even if driving the focus lens 103 thoroughly from near to infinity and thus determines that there is no focusable object. Thus, the flow proceeds to the step S1217, and the camera controller 207 sets the search driving flag to OFF. Next, in the step S1218, the camera controller 207 clears the focus detection error count value and the end count value. Next, in the step S1219, the camera controller 207 stops driving the focus lens 103, and ends the processing.

On the other hand, when the end count value is not larger than 1 in the step S1216 (No in the step S1216), the flow proceeds to the step S1220. In the step S1220, the camera controller 207 sets the driving direction of the focus lens 103 to a driving direction opposite to the current driving direction. Next, in the step S1212, the camera controller 207 sets a predetermined driving amount. Next, in the step S1213, the camera controller 207 drives the focus lens 103 based on the predetermined driving amount set in the step S1212 and the driving direction set in the step S1220, and ends the processing.

When the search driving flag is OFF in the step S1207 (No in the step S1207), the search operation has not yet been started. Therefore, the flow proceeds to the step S1208, and the camera controller 207 turns on the search driving flag. Next, in the step S1209, the camera controller 207 determines whether the reliability of the defocus amount is "medium."

If it is determined in the step S1209 that the defocus amount has a "medium" reliability (Yes in the step S1209), the flow proceeds to the step S1210. In the step S1210, the camera controller 207 sets the driving direction using the defocus direction (calculation result) acquired from the AF signal processor 204. Next, in the step S1212, the camera controller 207 sets a predetermined driving amount. Next, in the step S1213, the camera controller 207 drives the focus lens 103 in the defocus direction acquired in the step S1210 by the predetermined driving amount set in the step S1212, and ends the processing.

On the other hand, when the defocus amount does not have the "medium" reliability in the step S1209 (No in the step S1209), the flow proceeds to the step S1211. In the step S1211, the camera controller 207 sets the driving direction to the direction separating from the lens end. Next, in the step S1212, the camera controller 207 sets a predetermined driving amount. Next, in the step S1213, the camera controller 207 drives the focus lens 103 by the predetermined driving amount set in the step S1212 in the driving direction set in the step S1211, and ends the processing.

As the predetermined driving amount in the step S1212, a value previously stored in the nonvolatile memory (not shown) provided in the imaging apparatus 100 may be used. For example, the predetermined driving amount is a driving amount seven times as long as the depth of focus. The predetermined driving amount may be variable according to the focal length. For example, the longer the focal length is, the larger the driving amount is.

Figure 13:
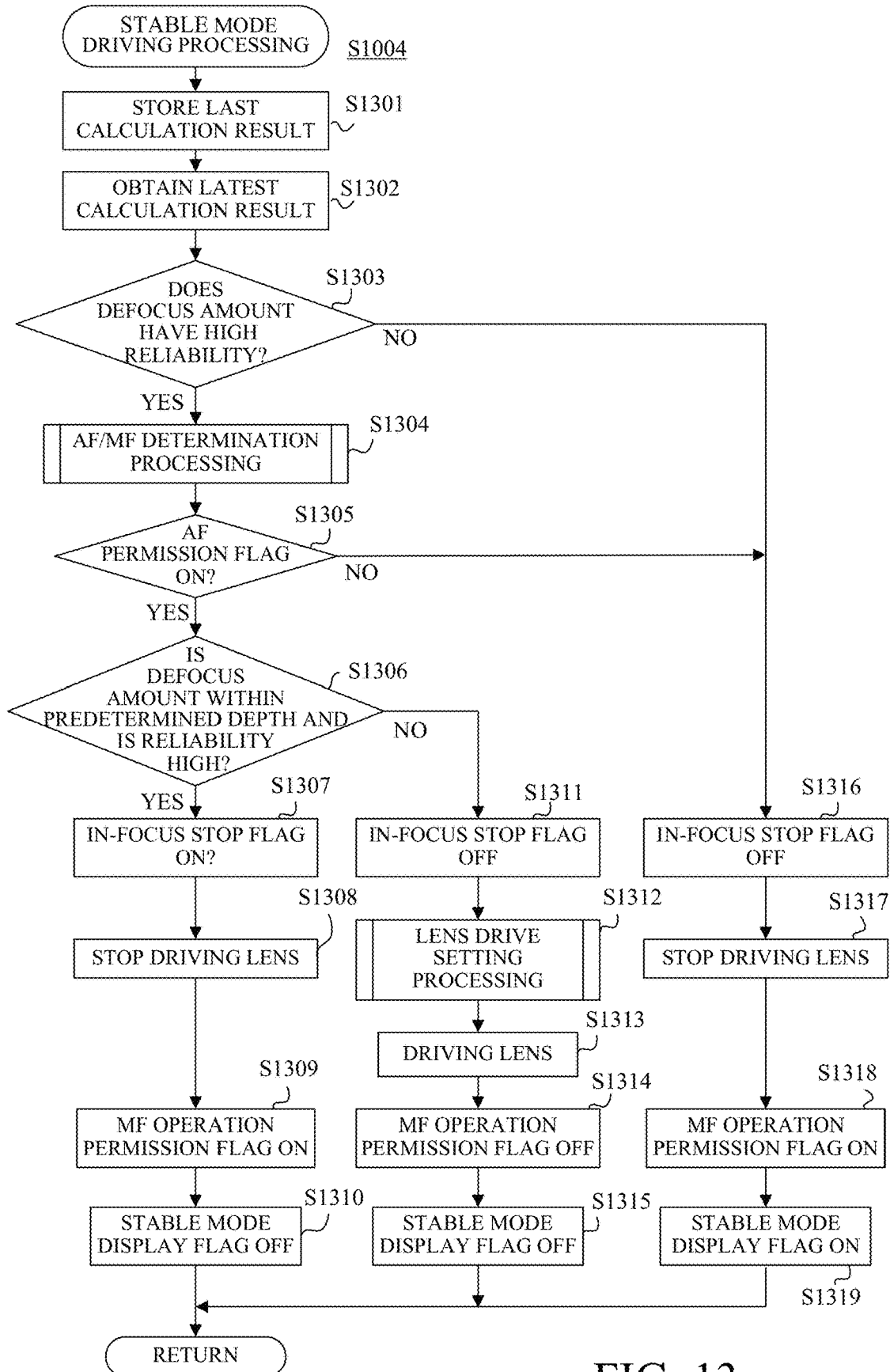
FIG. 13 is a flowchart showing driving processing in a stable mode according to each embodiment.

Referring now to FIG. 13, a description will be given of the stable mode driving processing (step S1004). FIG. 13 is a flowchart showing the stable mode driving processing. Each step in FIG. 13 is mainly executed by the camera controller 207.

First, in the step S1301, the camera controller 207 stores the last calculation result (defocus amount, defocus direction, and reliability information) acquired from the AF signal processor 204 in the nonvolatile memory such as the internal memory in the camera controller 207. In this embodiment, similar to the step S1101, an area such as a ring buffer is provided to save a history of a plurality of calculation results, and in storing the last calculation results, earlier calculation results are shifted and stored, but the present invention is not limited to this embodiment. Next, in the step S1302, the camera controller 207 acquires the latest calculation result from the AF signal processor 204.

Next, in the step S1303, the camera controller 207 determines whether the defocus amount has a "high" reliability. If the reliability of the defocus amount is not "high" (No in the step S1303), the flow proceeds to the step S1316, and the camera controller 207 sets the focus stop flag to OFF. Next, in the step S1317, the camera controller 207 stops driving the focus lens 103. Next, in the step S1318, the camera controller 207 sets the MF operation permission flag to ON. Next, in the step S1319, the camera controller 207 turns on the stable mode display flag, and ends the processing.

On the other hand, if the reliability of the defocus amount is "high" in the step S1303 (Yes in the step S1303), the flow proceeds to the step S1304 and the camera controller 207 performs the AF/MF determination processing. The AF/MF determination processing will be described later with reference to FIG. 14. Next, in the step S1305, the camera controller 207 determines whether the AF permission flag is ON. If the AF permission flag is OFF, the processing proceeds to the step S1316. On the other hand, if the AF permission flag is ON, the processing proceeds to the step S1306.

In the step S1306, the camera controller 207 determines whether the defocus amount falls within the predetermined depth and the reliability is "high." If the defocus amount falls within the predetermined depth and the reliability is "high," the flow proceeds to the step S1307. In the step S1307, the camera controller 207 sets the focus stop flag to ON. Next, in the step S1308, the camera controller 207 stops driving the lens. Next, in the step S1309, the camera controller 207 sets the MF operation permission flag to ON. Next, in the step S1310, the camera controller 207 sets the stable mode display flag to OFF, and ends the processing.

On the other hand, if it is determined in the step S1306 that the defocus amount does not fall within the predetermined depth or the reliability is not "high," the flow proceeds to the step S1311. In the step S1311, the camera controller 207 sets the focus stop flag OFF. Next, in the step S1312, the camera controller 207 performs the lens drive setting processing.

Figure 23:
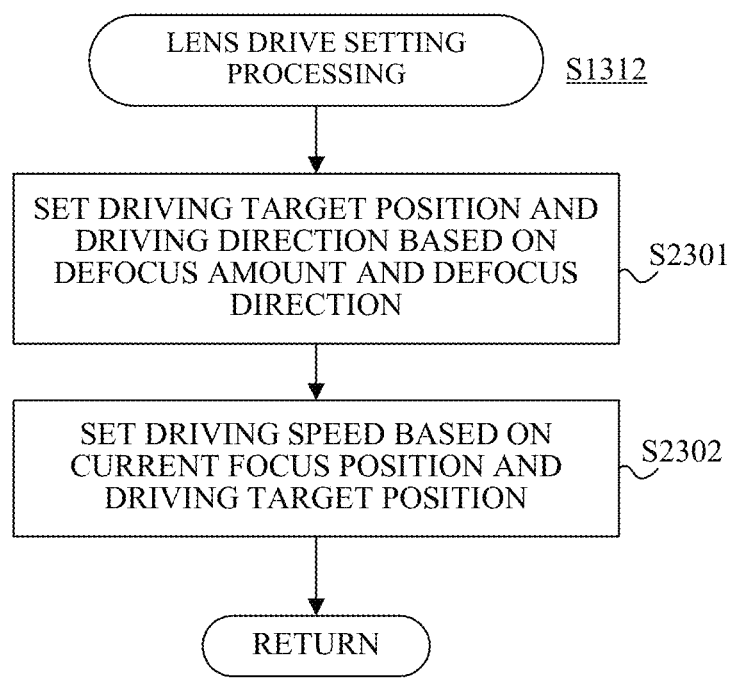
FIG. 23 is a flowchart showing lens drive setting processing according to the first embodiment.

FIG. 23 is a flowchart showing the lens drive setting processing (step S1312). Each step in FIG. 23 is mainly executed by the camera controller 207. Initially, in the step S2301, the camera controller 207 sets a driving target position and a driving direction of the focus lens 103 based on the defocus amount and the defocus direction acquired in the step S1302. Herein, the driving target position corresponds to a position obtained by adding the driving amount of the focus lens 103 calculated based on the defocus amount to the current position of the focus lens 103 detected by the lens position detector (not shown). When the defocus amount has a high reliability, the driving target position can be considered to be substantially equivalent to the in-focus position. However, since the reliability of the calculated defocus amount is low in a large blur state apart from the in-focus position, etc., the search driving is performed in which the focus lens 103 is driven by a predetermined amount in a predetermined direction without using the defocus amount for searching for an object. In the above case, the search driving start direction is set to the defocus direction acquired in the step S1302.

Next, in the step S2302, the camera controller 207 sets the driving speed of the focus lens 103 based on the driving target position and the current position of the focus lens 103 set in the step S2301. Herein, a value obtained by dividing the difference between the current position and the driving target position by a predetermined time is set for driving between the current position and the driving target position for a predetermined time. In practice, in order not to exceed the driving target position with a smooth focus operation, the deceleration may be performed in front of the driving target position. The driving speed in the search control described above is previously stored in a nonvolatile memory such as the internal memory of the camera controller 207, and may be changed according to a menu setting, such as AF speed (not shown).

Next, in the step S1313 in FIG. 13, the camera controller 207 drives the lens. Next, in the step S1314, the camera controller 207 sets the MF operation permission flag OFF. Next, in the step S1315, the camera controller 207 sets the stable mode display flag OFF, and ends the processing.

Figure 14:
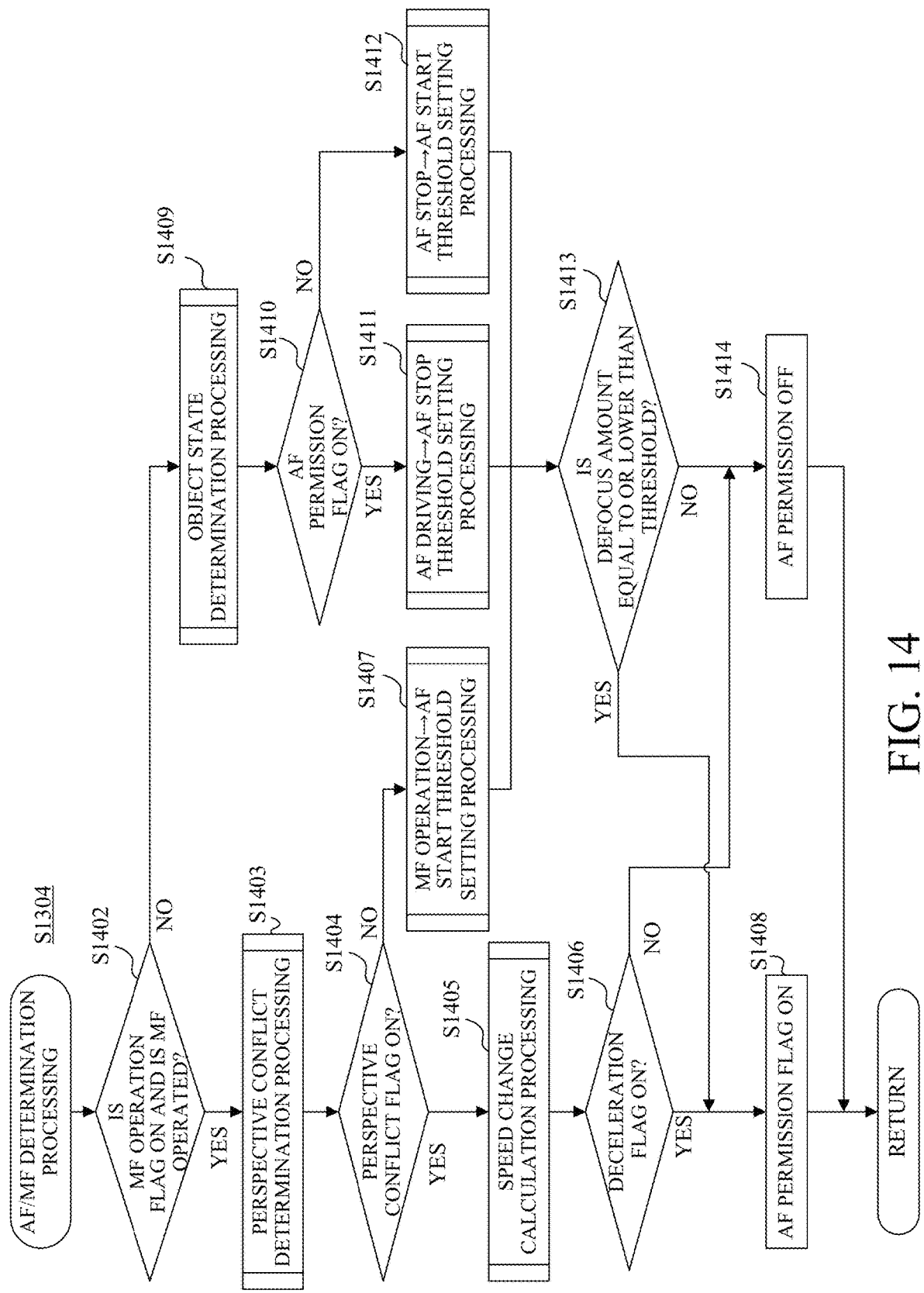
FIG. 14 is a flowchart showing AF/MF determination processing according to a first embodiment.

Referring now to FIG. 14, a description will be given of the MF/AF determination processing (step S1304). Each step in FIG. 14 is mainly executed by the camera controller 207. Initially, in the step S1402, the camera controller 207 determines whether the MF operation flag is ON and the MF is being operated. If the MF operation flag is ON and the MF is being operated (Yes in the step S1402), the flow proceeds to the step S1403 and the camera controller 207 performs perspective conflict determination processing. The perspective conflict determination processing will be described later with reference to FIGS. 16A-16G and 17A and 17B. On the other hand, if the MF operation flag is OFF or the MF is not being operated, the flow proceeds to the step S1409, and the camera controller 207 performs the object state determination processing. The object state determination processing will be described later with reference to FIG. 24.

In the step S1404, the camera controller 207 determines whether the perspective conflict flag is ON. If the perspective conflict flag is ON, the flow proceeds to the step S1405, and the camera controller 207 performs speed change calculation processing. The speed change calculation processing will be described later with reference to FIGS. 18A-18C and 19. On the other hand, if the perspective conflict flag is OFF, the flow proceeds to the step S1407, and the camera controller 207 performs MF operation→AF start threshold setting processing. The MF operation→AF start threshold setting processing will be described later with reference to FIGS. 20, 21A, and 21B.

In the step S1406, the camera controller 207 determines whether the deceleration flag is ON. If the deceleration flag is ON, the flow proceeds to the step S1408. In the step S1408, the camera controller 207 sets the AF permission flag to ON and ends the processing. On the other hand, if the deceleration flag is OFF, the flow proceeds to the step S1414. In the step S1414, the camera controller 207 sets the AF permission flag to OFF and ends the processing.

In the step S1410, the camera controller 207 determines whether the AF permission flag is ON. If the AF permission flag is ON, the flow proceeds to the step S1411, and the camera controller 207 performs AF driving→AF stop threshold setting processing. The AF driving→AF stop threshold setting processing will be described later with reference to FIG. 22. On the other hand, if the AF permission flag is OFF in the step S1410, the flow proceeds to the step S1412, and the camera controller 207 performs the AF stop→AF start threshold setting processing. The AF stop→AF start threshold setting processing in the step S1412 is one of the features of this embodiment, and the details thereof will be described later with reference to FIG. 25.

After the threshold setting processing in the step S1407, S1411, or S1412 is completed, the flow proceeds to the step S1413. In the step S1413, the camera controller 207 determines whether the defocus amount is equal to or less than the threshold calculated in the step S1407, S1411, or S1412. If the defocus amount is equal to or less than the threshold, the flow proceeds to the step S1408. In the step S1408, the camera controller 207 sets the AF permission flag to ON and ends the processing. On the other hand, if the defocus amount is larger than the threshold, the flow proceeds to the step S1414. In the step S1414, the camera controller 207 turns off the AF permission flag and ends the processing.

<Perspective Conflict Determination Processing>

Figure 16A:
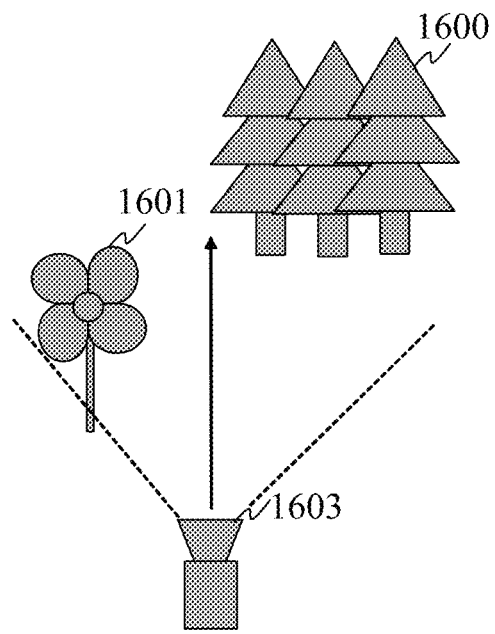
FIGS. 16A-16G are explanatory views of perspective conflict determination processing according to the first embodiment.
Figure 16B:
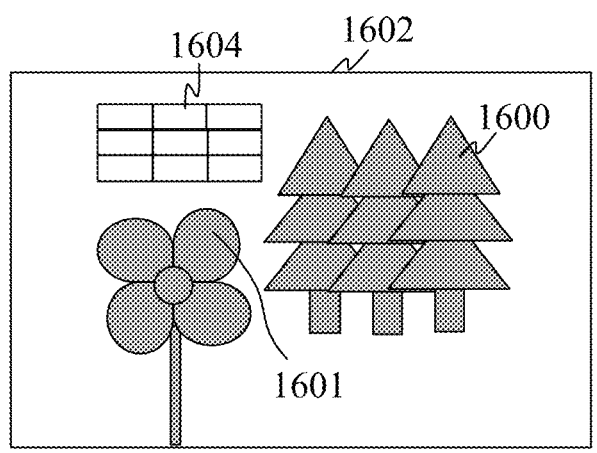

Referring now to FIGS. 16A to 16G, a description will be given of perspective conflict determination processing (step S1403). FIGS. 16A to 16G are explanatory views of the perspective conflict determination processing. Initially, as illustrated in FIG. 16A, assume a scene having an object 1601 on the near side and an object 1600 on the infinity side for a camera 1603. FIG. 16B is an actual captured angle of view 1602 in the scene. The user can arrange a focus detection frame 1604 having a matrix of focus detection frames (areas 302) illustrated in FIG. 3 at arbitrary position for the in-focus operation. This embodiment uses a total of nine (3×3) focus detection frames 1604 to performs a focus detection. The number of focus detection frames is not limited to this embodiment, and is arbitrarily variable.

Figure 16C:
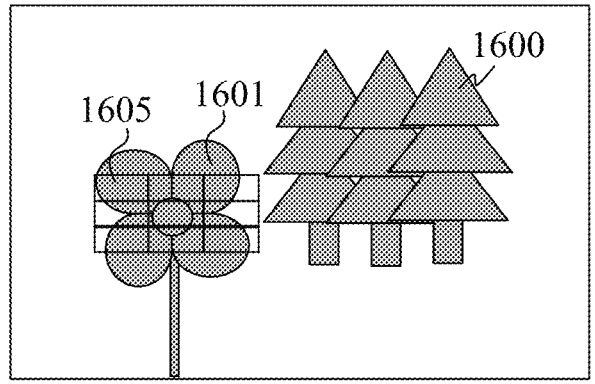

FIG. 16C illustrates the focus detection frame position where there is no perspective conflict. A focus detection frame 1605 is set to the object 1601. Hence, when the defocus amount calculated as the focus detection result is converted into the depth of focus, it is as illustrated in FIG. 16E. As illustrated in FIG. 16E, the focus detection result of each focus detection frame falls within a range of about 0 to 1.0 times as long as the depth of focus.

Figure 16D:
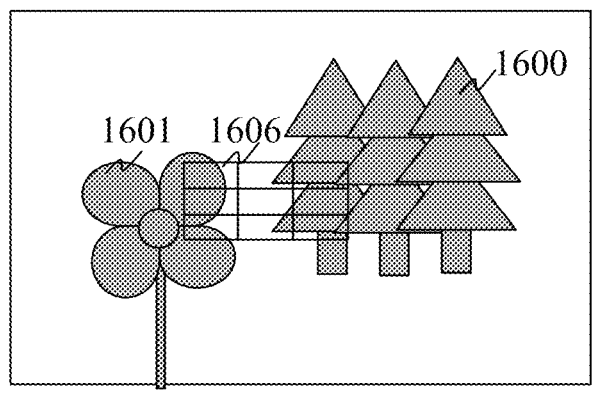
Figure 16E:
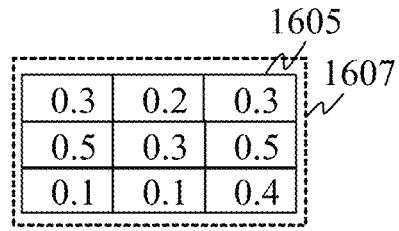
Figure 16F:
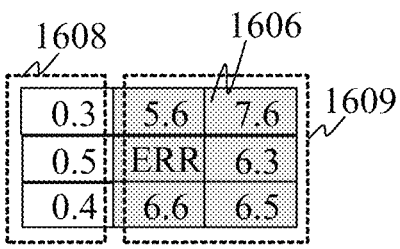

On the other hand, FIG. 16D illustrates the focus detection frame position in the perspective conflict. The focus detection frame 1606 is set to the objects 1601 and 1600. Hence, the defocus amount calculated as the focus detection result is converted to the depth of focus, as illustrated in FIG. 16F. As illustrated in FIG. 16F, when the object 1601 is in the in-focus state, the focus detection result of a focus detection frame 1608 enclosed by a broken line falls within a value of about 0 to 1.0 times as long as the depth of focus. On the other hand, a focus detection frame 1609 enclosed by a broken line set for the focus detection frame of the object 1600 has a value greatly exceeding the depth of focus, or the focus detection result has a low reliability or may be calculated as Err (error value). In other words, for the non-perspectively conflicting object, the values in the plurality of focus detection frames fall within a predetermined range, while for the perspectively conflicting objects, the values in the plurality of focus detection frames may be outside the predetermined range. This embodiment sets a predetermined range to "four times as long as the depth of focus," and when the defocus amount more than that is calculated, the object on the infinity side and the object on the near side exist in the focus detection frames rather than the same object, although the present invention is not limited to this embodiment.

Referring now to FIG. 17A, a description will be given of a processing flow of the perspective conflict determination processing. FIG. 17A is a flowchart showing the perspective conflict determination processing. Each step in FIG. 17A is mainly executed by the camera controller 207.

First, in the step S1701, the camera controller 207 determines whether there is an area with a low reliability in the focus detection frame. If there is an area with a low reliability, the flow proceeds to the step S1704. In the step S1704, the camera controller 207 turns on the perspective conflict flag, and ends the processing.

On the other hand, if there is no area with a low reliability in the focus detection frame in the step S1701, the flow proceeds to the step S1702. In the step S1702, the camera controller 207 determines whether the focus detection result in the focus detection frame falls within the predetermined depth "Thc." The predetermined depth "Thc" is a threshold used to determine whether the object is the same object, and is four times as long as the depth of focus in this embodiment. However, the present invention is not limited to this embodiment and, for example, the predetermined depth "Thc" is variable according to the zoom lens position or the like.

If it is determined in the step S1702 that the focus detection result in the focus detection frame falls within the range of the predetermined depth "Thc," the flow proceeds to the step S1703. In the step S1703, the camera controller 207 sets the perspective conflict flag to OFF and ends the processing. On the other hand, if the focus detection result in the focus detection frame does not fall within the range of the predetermined depth "Thc," the flow proceeds to the step S1704.

Depending on the state of the object, the above determination method may not determine the perspective conflict because the focus detection result is not stable. Accordingly, one method can simply determine the perspective conflict depending on the frame size set by the user.

Figure 16G:
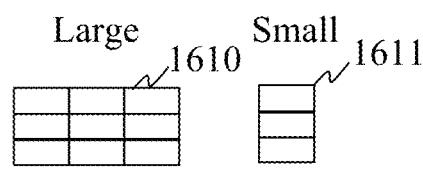

FIG. 16G illustrates a frame size. The user can change the size of the focus detection frame used for the AF through an unillustrated user interface. For example, when the user selects a focus detection frame of a large size (also referred to as a first size) (when the focus detection frame setting is Large), reference numeral 1610 denotes a focus detection frame. On the other hand, when the user selects a focus detection frame of a small size (also referred to as a second size) (when the focus detection frame setting is Small), reference numeral 1611 is a focus detection frame. This is switching of the size of the focus detection frame 1604 between a total of nine (3×3) AF frames and a total of three (3×1) AF frames. The area of the focus detection frame (Large) is three times as wide as the area of the focus detection frame setting (Small), a large amount of image information can be obtained within the focus detection frame, and the focus detection result becomes stable. Since a plurality of objects can be included, the perspective conflict is likely to occur.

On the other hand, since the focus detection area (Small) has a small focus detection area, only a limited object may be targeted within the focus detection area Thus, the perspective conflict can be avoided. However, the focus detection result may become unstable because an amount of obtained image information is small. Thus, the perspective conflict determination may be performed based on the size of the focus detection frame.

Referring now to FIG. 17B, a description will be given of a processing flow for performing the perspective conflict determination based on the size of the focus detection frame. FIG. 17B is a flowchart showing the perspective conflict determination processing according to the size of the focus detection frame. Each step in FIG. 17A is mainly executed by the camera controller 207.

First, in the step S1705, the camera controller 207 determines whether the focus detection frame setting is Small. If the focus detection frame setting is Small, the flow proceeds to the step S1706. In the step S1706, the camera controller 207 sets the perspective conflict flag to OFF and ends the processing. On the other hand, if the focus detection frame setting is Large, the flow proceeds to the step S1707. In the step S1707, the camera controller 207 sets the perspective conflict flag to ON, and ends the processing.

This embodiment determines whether the perspective conflict is large or small by the two sizes of the focus detection frames, but the type of the size of the focus detection frame is not limited to this embodiment. The size of the focus detection frame may be a frame size that can capture a variety of objects and is less likely to cause the perspective conflict.

<Speed Calculation Processing>

Referring now to FIGS. 18A to 18C, a description will be given of an outline of the speed change calculation processing (step S1405). FIGS. 18A to 18C are explanatory views of the speed change calculation processing, and illustrate graphs of the relationship among the focus lens position, the driving speed, and the driving acceleration with respect to time. It is known that an ideal manual operation of the user includes three parts, such as acceleration t1, constant speed t2, and deceleration t3. It is a purpose of this embodiment to detect the constant speed and deceleration of the focus lens. In FIGS. 18A to 18C, taf1 and taf2 denote timings at which driving of the focus lens changes, and taf3 denotes the end of the in-focus operation of the object.

FIG. 18A is a graph showing the relationship between time and focus lens position. In FIG. 18A, Zaf1 is a position that starts the constant speed and switches to the AF control, Zaf2 is a position that reaches the predetermined defocus amount and changes the control to the AF, and Zaf3 is a position that switches to the deceleration and changes the control to the AF. Zaf4 is the in-focus position.

Switching to the AF described in this embodiment has three cases or (1) Zaf1: when the speed is changed to the constant speed, (2) Zaf2: pattern when a predetermined DEF amount is reached, (3) Zaf3: when the speed is changed to the deceleration. An advantage and a disadvantages of each of the three cases will now be described below.

Initially, in the case (1), the intention of the user to make an image is found once the constant speed is known, the imaging intended by the user can be realized by the AF by succeeding the AF with this speed. On the other hand, for the perspectively conflicting objects, which object to be focused on cannot be determined and thus a wrong object may be disadvantageously focused. Since the manual focus operation time for the user is shortened, the operability of the user may be degraded disadvantageously.

In the case (2), the manual focus operation time of the user is longer than that in the case (1), and it is an advantage that the operability of the user can be maintained. The user can be prevented from failing in the manual focus by changing the predetermined defocus amount according to the object condition. In other words, the user can be prevented from failing to decelerate too early for a dark object or object with a deep depth of field. On the other hand, since the predetermined defocus amount changes according to the object condition, the operability of the user may disadvantageously deteriorate if the object condition is erroneously determined.

In the case (3), the AF can be performed for the object intended by the user when there are the perspectively conflicting objects. On the other hand, since switching to the AF is unavailable until the deceleration is detected, the in-focus position of the object may be exceeded, or an early deceleration occurs for a dark object or an object with a deep depth of field, and the ideal AF cannot be realized disadvantageously.

FIG. 18B is a graph showing the relationship between time and a driving speed of the focus lens obtained by time-differentiating the graph of FIG. 18A. As illustrated in FIG. 18B, the speed reaches a certain maximum value in the constant speed region t2. In order to determine the constant speed, it is thus sufficient to set a threshold Vaf and to detect that a speed V is equal to or higher than the threshold Vaf (V≥Vaf).

FIG. 18C is a graph obtained by further time-differentiating the graph of FIG. 18B and shows a relationship between time and a driving acceleration of the focus lens. As illustrated in FIG. 18C, the acceleration A is substantially zero in the constant speed region t2. In order to determine the constant speed, it is thus sufficient to set the threshold Aaf1 and the threshold Aaf1' and to detect that the acceleration A falls within the range of two thresholds (Aaf1'≤A≤Aaf1).

The acceleration has a minimum value in the deceleration region t3. In order to determine the deceleration, it is sufficient to set the threshold Aaf2 of the AF driving start relating to the focus lens driving acceleration and to detect this minimum value. The object intended by the user can be focused on by detecting the constant speed and the deceleration described above and switching from the MF driving to the AF driving. This embodiment uses the position of the focus lens, but may use the position of the focus ring or a defocus amount change to obtain the similar result.

Figure 19:
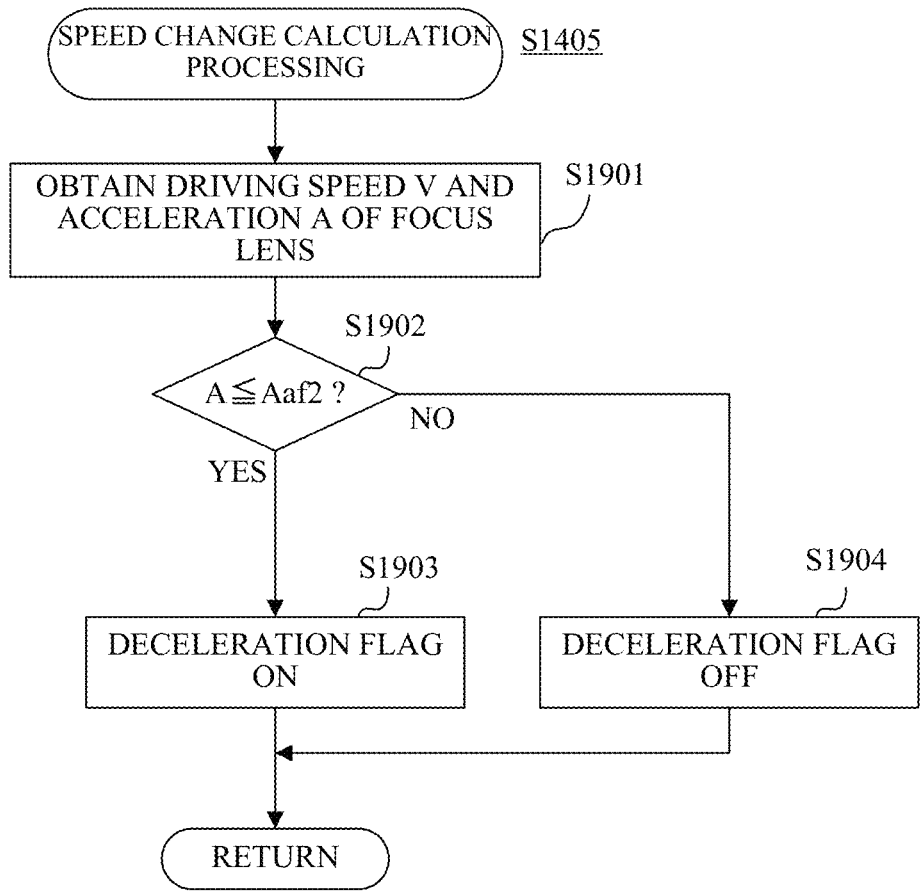
FIG. 19 is a flowchart showing speed change calculation processing according to the first embodiment.

Referring now to FIG. 19, a description will be given of the speed change calculation processing (step S1405). Each step in FIG. 19 is mainly executed by the camera controller 207.

Initially, in the step S1901, the camera controller 207 acquires the driving speed V and the acceleration A of the focus lens. The driving speed V and the acceleration A of the focus lens are calculated based on the position information of the focus lens.

Next, in the step S1902, the camera controller 207 determines whether A≤Aaf2 is satisfied. When A≤Aaf2 is satisfied, the flow proceeds to the step S1903. In the step S1903, the camera controller 207 sets the deceleration flag to ON and ends the processing. When A≤Aaf2 is not satisfied, the flow proceeds to the step S1904. In the step S1904, the camera controller 207 sets the deceleration flag to OFF and ends the processing.

<Object State Determination Processing>

Figure 24:
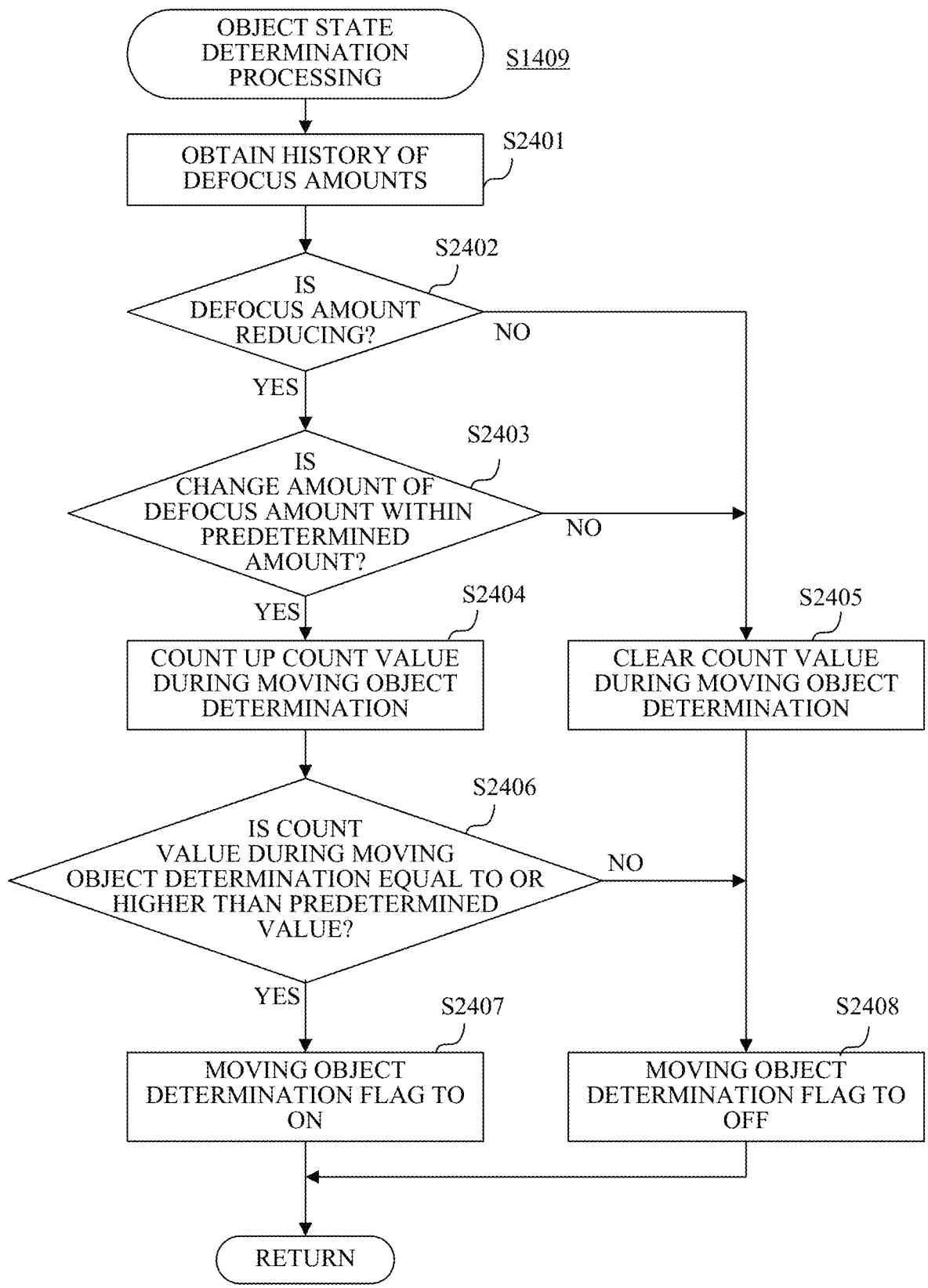
FIG. 24 is a flowchart showing object state determination processing according to the first embodiment.

Referring now to FIG. 24, a description will be given of object state determination processing (step S1409). FIG. 24 is a flowchart showing the object state determination processing. Each step in FIG. 24 is mainly executed by the camera controller 207.

Initially, in the step S2401, the camera controller 207 acquires a history of calculation results (defocus amount, defocus direction, and reliability information) stored in the nonvolatile memory in the step S1301. This embodiment acquires the history of defocus amounts among the calculation results, and uses it for the processing after the step S2402. The present invention is not limited to this embodiment, but may acquire both the defocus direction and the reliability information and use them for the subsequent processing.

Next, in the step S2402, the camera controller 207 determines whether the defocus amount has decreased based on the history of the defocus amounts acquired in the step S2401. If the defocus amount has not decreased (No in the step S2402), the flow proceeds to the step S2405. In the step S2405, the camera controller 207 clears the count value during the moving object determination. Next, in the step S2408, the camera controller 207 sets the moving object determination flag to OFF and ends the processing. The defocus amount decreasing or approaching to 0 means that the object is approaching to the in-focus direction.

On the other hand, if the defocus amount is decreasing in the step S2402 (Yes in the step S2402), the flow proceeds to the step S2403. In the step S2403, the camera controller 207 determines whether the change amount of the defocus amount falls within a predetermined amount. If the change amount of the defocus amount does not fall within the predetermined amount (No in the step S2403), the flow proceeds to the step S2405 similar to the case of No in the step S2402. In the step S2405, the camera controller 207 clears the count value during the moving object determination. Next, in the step S2408, the camera controller 207 sets the moving object determination flag to OFF and ends the processing. The determination is made in the step S2403 because it is conceivable that the defocus amount of another object appears when the defocus amount has largely changed, and that the object is gradually approaching when the change of the defocus amount is small.

On the other hand, if the change amount of the defocus amount falls within the predetermined amount in the step S2403 (Yes in the step S 2403), the flow proceeds to the step S2404. In the step S2404, the camera controller 207 counts up (increments) (+1) the count value during the moving object determination.

Next, in the step S2406, the camera controller 207 determines whether the count value during the moving object determination is equal to or higher than a predetermined value. If the count value during moving body determination is equal to or higher than the predetermined value (Yes in the step S2406), the flow proceeds to the step S2407. In the step S2407, the camera controller 207 sets the moving object determination flag to ON and ends the processing. On the other hand, if the count value during moving object determination is lower than the predetermined value (No in the step S2406), the flow proceeds to the step S2408. In the step S2408, the camera controller 207 sets the moving object determination flag to OFF and ends the processing. The determination is made in the step S2406 to determine the object as a moving object only when the object is continuously approaching in the in-focus direction, and to prevent the erroneous determination of the moving object due to a momentary change in the defocus amount or the like.

<MF Operation→AF Start Threshold Setting Processing>

Figure 20:
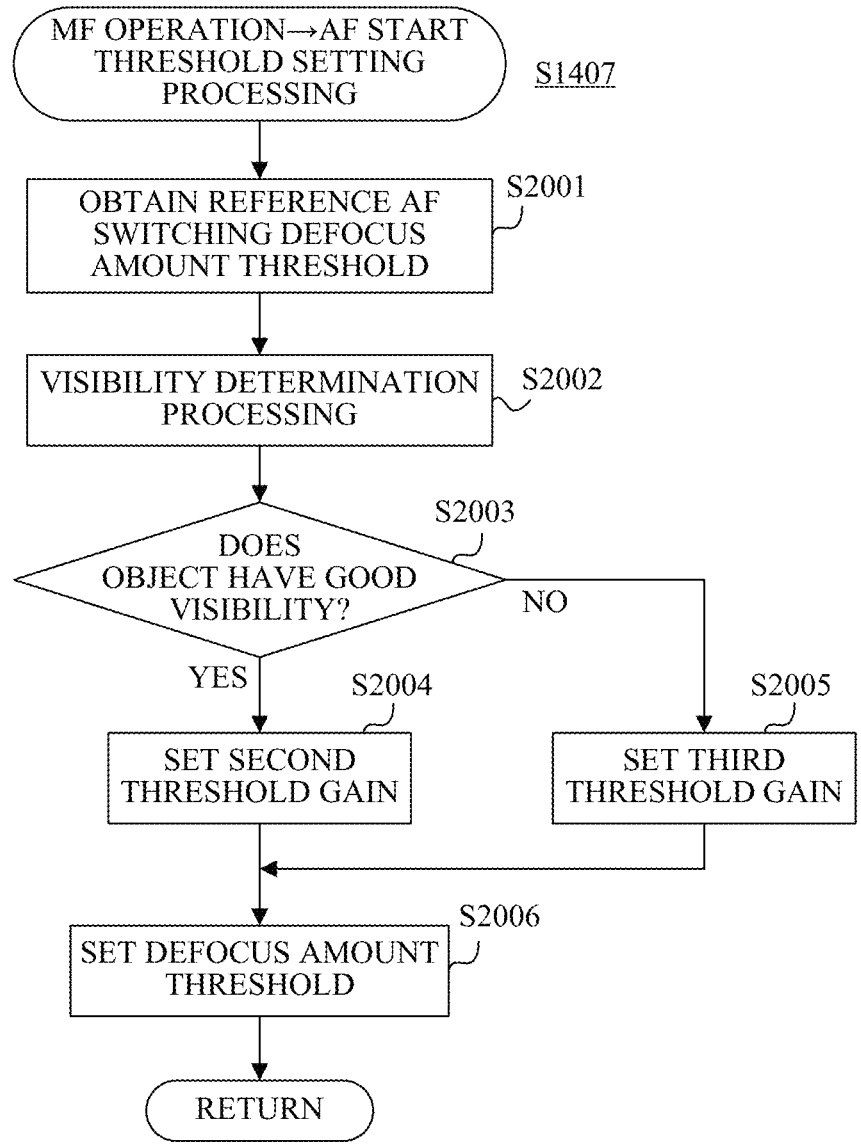
FIG. 20 is a flowchart showing MF operation→AF start threshold setting processing according to the first embodiment.
Figure 21A:
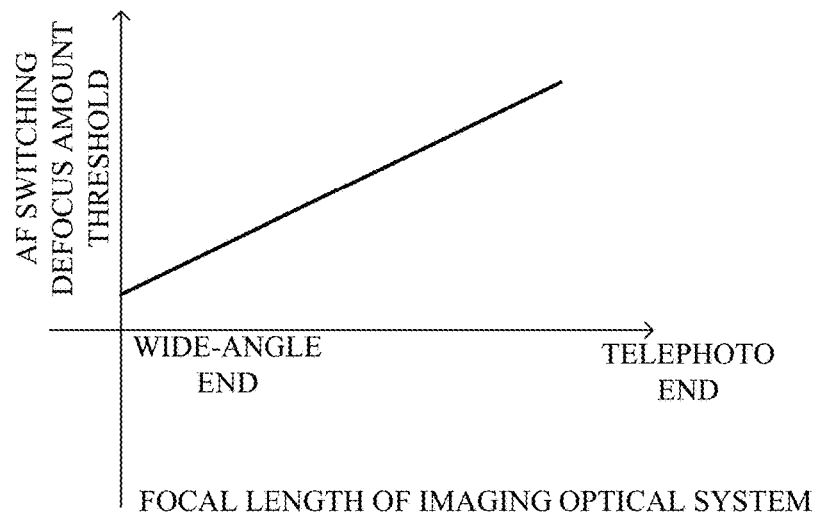
FIGS. 21A and 21B are explanatory views of a defocus amount threshold according to the first embodiment.
Figure 21B:
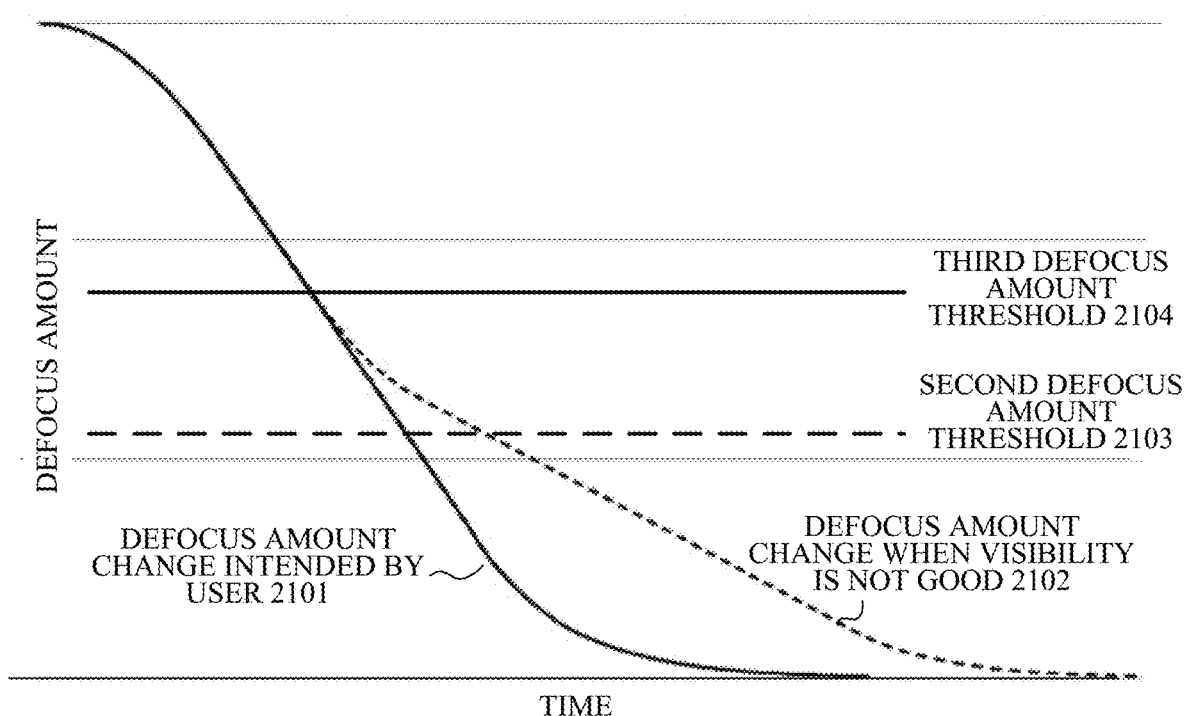

Referring now to FIGS. 20, 21A, and 21B, a description will be given of the MF operation→AF start threshold setting processing (step S1407). FIG. 20 is a flowchart showing the MF operation→AF start threshold setting processing. Each step in FIG. 20 is mainly executed by the camera controller 207. FIGS. 21A and 21B are explanatory views of the defocus amount threshold. In FIG. 21A, the abscissa axis represents the focal length of the imaging optical system, and the ordinate axis represents the AF switching defocus amount threshold. In FIG. 21B, the abscissa axis represents time, and the ordinate axis represents the defocus amount.

First, in the step S2001 in FIG. 20, the camera controller 207 acquires a reference AF switching defocus amount threshold. When the defocus amount calculated by the AF signal processor (focus detector) 204 is lower than the defocus amount threshold, the camera controller 207 starts driving the AF regardless of the lens operation unit (focus operation unit) 107 during the execution.

The defocus amount threshold may be obtained by storing a predetermined value in a nonvolatile memory (not shown) and by reading and setting it, or by defining it through an expression etc. so that it can dynamically change according to an imaging parameter (imaging condition) such as a focal length or an object distance. However, the method of setting the defocus amount threshold is not limited to this method. In this embodiment, as illustrated in FIG. 21A, a larger defocus amount threshold is set as the focal length becomes longer. If a value larger than the threshold is set to the defocus amount threshold, more smooth switching is available from the MF to the AF. When a value smaller than the threshold is set to the defocus amount threshold, the focus can be prevented from shifting to another object during focusing.

Next, in the step S2002, the camera controller 207 determines the visibility of the object using the parameter (visibility determination processing). Herein, the parameter for determining the visibility is a factor that provides the captured image with an effect that makes it difficult to estimate a true in-focus position when the user visually focuses on the object. For example, as the depth of field is deep, it is difficult to estimate the true in-focus position since a wide range appears to be focused. When the imaging sensor gain is high, the S/N ratio of the image lowers, and when chipped whites or crashed shadows occur in the object area, the contrast of the object lowers. In either case, it becomes difficult to find the focusing peak position.

The parameter is not limited to that described in this embodiment, as long as they affect the visibility of the captured image (object). The determination determines that the object does not have a good visibility when a certain single parameter exceeds a threshold or a plurality of parameters are scored and the total value exceeds a threshold. The threshold may be a value previously stored in the nonvolatile memory, or may be calculated according to an imaging parameter. Similar to the parameters, the resolution of the display unit 205 and the presence or absence of an external output (not shown) may also be factors affecting the visibility. When there is no external output destination, the display unit 205 is often relatively small and it is difficult to visually estimate the focusing peak position where the resolution of the display unit 205 is low.

Next, in the step S2003, the camera controller 207 determines whether the visibility is good based on the determination result of the visibility of the object in the step S2002. If the visibility is good, the flow proceeds to the step S2004, and the camera controller 207 sets a second threshold gain. On the other hand, if the visibility is not good, the flow proceeds to the step S2005, and the camera controller 207 sets a third threshold gain.

Next, in the step S2006, the camera controller 207 sets a defocus amount threshold using the second threshold gain set in the step S2004 or the third threshold gain set in the step S2005. In this embodiment, the third defocus amount threshold calculated using the third threshold gain is larger than the second defocus amount threshold calculated using the second threshold gain. The camera controller 207 thus sets the defocus amount threshold and ends the processing.

A description will now be given of the reason for increasing the AF switching defocus amount threshold when the visibility is not good. FIG. 21B plots the defocus amount time changing from the MF operation to the AF where the visibility is good and where the visibility is not good. If the visibility of the captured image is good, the user can perform the intended MF operation, the defocus amount smoothly changes as illustrated by a solid line 2101, and when the defocus amount is lower than the second defocus amount threshold 2103, the focus mode is switched to the AF while the speed intended by the user is maintained.

On the other hand, if the visibility is not good, the user performs a careful MF operation due to a psychological factor, and unnecessarily decelerates before the focus mode is switched to the AF as indicated by a dotted line 2012. Since the deceleration has already been made when the defocus amount is lower than the second defocus amount threshold 2103, the focus mode is switched to the AF at a speed lower than the speed intended by the user, and the intended focus control is unavailable. Hence, when the visibility is not good, the AF switching defocus amount threshold is increased like the third defocus amount threshold 2104. Thereby, the focus mode can be switched to the AF before the unnecessary deceleration occurs, and the MF→AF control can be smoothly realized as illustrated by a solid line 2101.

<AF Driving→AF Stop Threshold Setting Processing>

Figure 22:
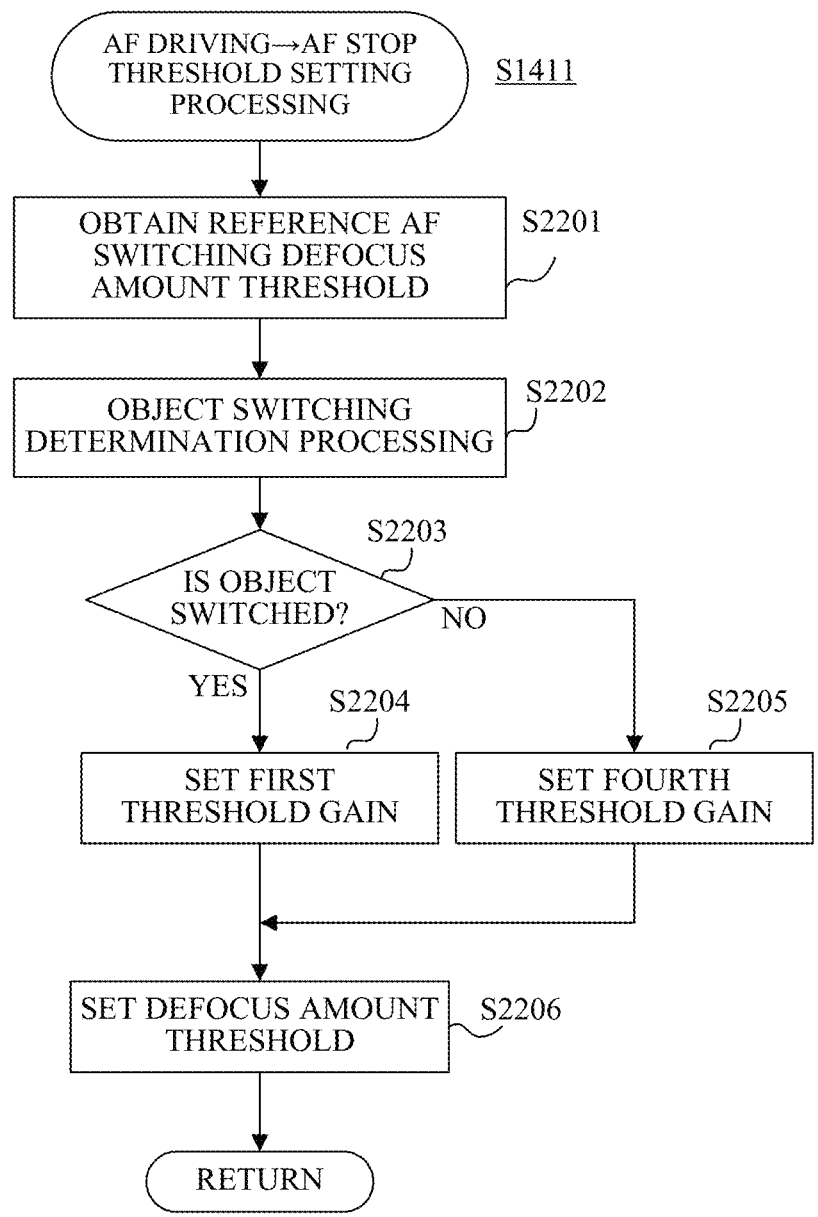
FIG. 22 is a flowchart showing AF driving→AF stop threshold setting processing according to the first embodiment.

Referring now to FIG. 22, a description will be given of the AF driving→AF stop threshold setting processing (step S1411). FIG. 22 is a flowchart showing the AF driving→AF stop threshold setting processing. Each step in FIG. 22 is mainly executed by the camera controller 207.

Initially, in the step S2201, the camera controller 207 acquires a reference AF switching defocus amount threshold similar to the step S2001 described above. Next, in the step S2202, the camera controller 207 performs the object switching determination processing. Next, in the step S2203, the camera controller 207 determines whether the object is switched according to a predetermined determination condition. The predetermined determination condition is an operation with a strong intention to change the object, such as panning, moving of an AF frame, and a zoom operation (zooming) in this embodiment. However, the predetermined determination condition is not limited to these examples, and switching the object may be determined based on another determination condition. Switching the object is determined when panning is detected by a known technique using a gyro sensor or the like, when an operation or control for changing a coordinates of the AF frame is performed for the movement of the AF frame, and when the zoom position is changed by the zoom operation member or control for the zoom operation.

If it is determined in the step S2203 that the object has been changed, the flow proceeds to the step S2204 and the camera controller 207 sets a first threshold gain. On the other hand, if it is determined that the object is not changed, the flow proceeds to the step S2205, and the camera controller 207 sets a fourth threshold gain.

Next, in the step S2206, the camera controller 207 sets the defocus amount threshold using the first threshold gain set in the step S2204 or the fourth threshold gain set in the step S2205. In this embodiment, the first defocus amount threshold calculated using the first threshold gain is larger than the fourth defocus amount threshold calculated using the fourth threshold gain. This configuration facilitates focusing on a new object by widening the AF driving range when the object is changed. The camera controller 207 sets the defocus amount threshold as described above, and ends the processing.

<AF Stop→AF Start Threshold Setting Processing>

Figure 25:
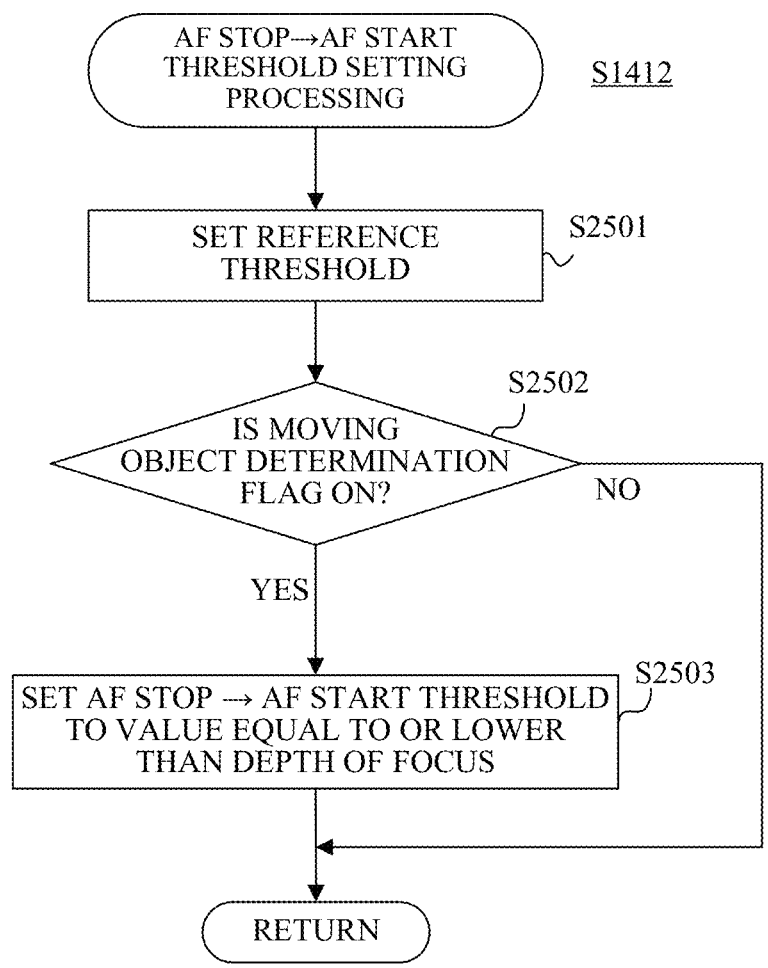
FIG. 25 is a flowchart showing an AF stop→AF start threshold setting processing according to the first embodiment.

Referring now to FIG. 25, a detailed description will be given of the AF stop→AF start threshold setting processing (step S1412) as one of the characteristics of this embodiment. FIG. 25 is a flowchart showing the AF stop→AF start threshold setting processing. Each step in FIG. 25 is mainly executed by the camera controller 207.

Initially, in the step S2501, the camera controller 207 sets a defocus amount threshold for switching from the AF stop to the AF as a reference threshold. Herein, the reference threshold is set in the same manner as that in the step S2001 described above. In this embodiment, the reference threshold is, for example, a defocus amount equivalent to about three times as long as the depth of focus according to the focal length. Setting the reference threshold to a value of a somewhat wide range for the in-focus position can properly focus on the object by the AF driving even if the object is changed.

Next, in the step S2502, the camera controller 207 determines whether the moving body determination flag determined in the object state determination processing in the step S1409 is ON. If the moving body determination flag is ON (Yes in the step S2502), the flow proceeds to the step S2503. In the step S2503, the camera controller 207 sets the AF stop→AF start threshold (defocus amount threshold) to a defocus amount corresponding to a value equal to or less than the depth of focus, and ends the processing. On the other hand, when the moving object determination flag is OFF in the step S2502 (No in the step S2502), the camera controller 207 maintains the AF stop→AF start threshold as the reference threshold, and ends the processing.

Referring now to FIGS. 26A to 26F and 27A to 27E, a description will be given of the operation of the AF stop→AF start threshold setting processing when the flow of FIG. 25 is executed. FIGS. 26A to 26F are schematic views when it is determined that the object is not a moving object. FIGS. 27A to 27F are schematic views when it is determined that the object is a moving object.

FIGS. 26A to 26D are conceptual diagrams of the motion of the object at each time when the moving object determination flag is OFF in a scene where the object enters the focus frame from the side. FIGS. 26E and 26F respectively illustrate the change of the defocus amount and the change of the object distance at that time. FIGS. 27A to 27D are conceptual diagrams of the motion of the object at each time when the moving object determination flag is ON in a scene where the object is approaching the in-focus position for the focus frame. FIGS. 27E and 27F respectively illuminate the change of the defocus amount and the change of the object distance at that time.

Figure 26E:
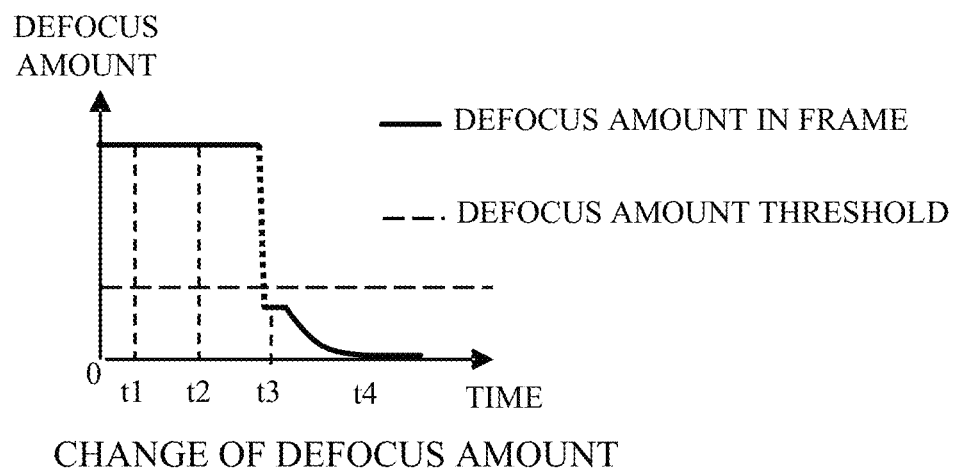
Figure 26F:
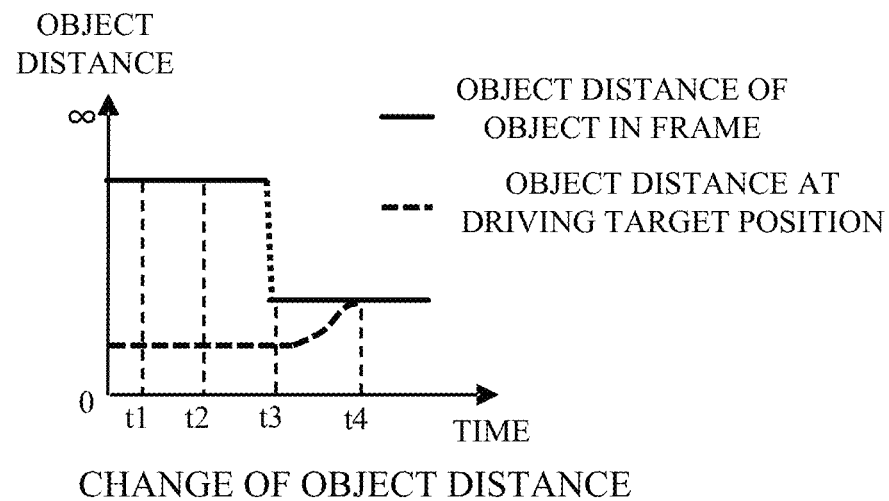

FIGS. 26A and 26B schematically illustrate a state in which another object (person) enters the focus frame set at the image center as illustrated in FIG. 26C while the AF driving is stopped, and the focus mode is switched to the AF driving. At this time, the defocus amount in the focus frame changes as illustrated by a solid line in FIG. 26E, and the defocus amount of the object (mountain) in the focus frame is larger than the threshold (broken line in FIG. 26E) at times t1 and t2. Hence, as illustrated by a broken line in FIG. 26F, the driving target position remains unchanged and the AF driving is stopped. Next, when the other object (person) enters the focus frame at time t3, the defocus amount becomes smaller than the threshold (broken line in FIG. 26E). Thus, as illustrated in FIG. 26F, the AF driving starts and in-focus is obtained at time t4.

Figure 27A:
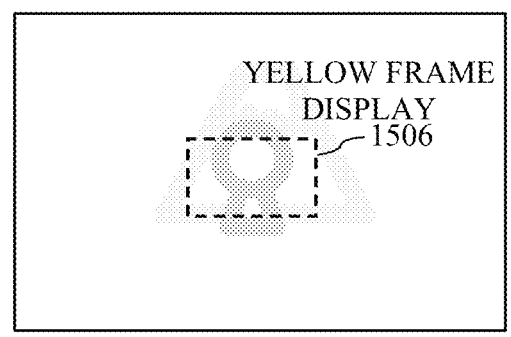
FIGS. 27A-27F are schematic views according to the first embodiment where it is determined that the object is the moving object.
Figure 27B:
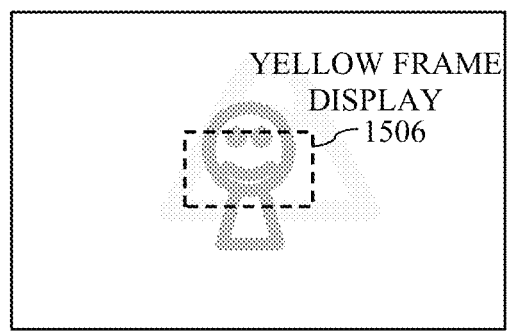
Figure 27C:
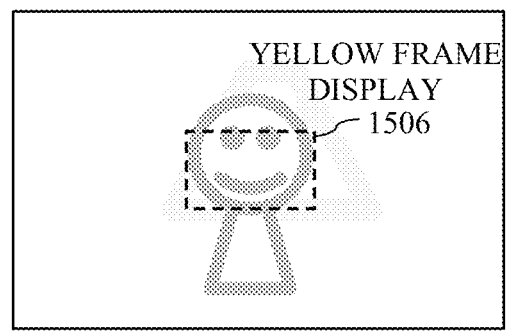
Figure 27D:
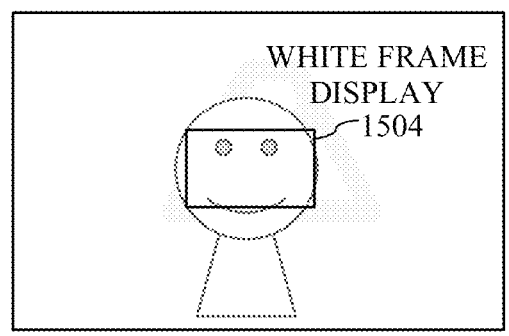
Figure 27E:
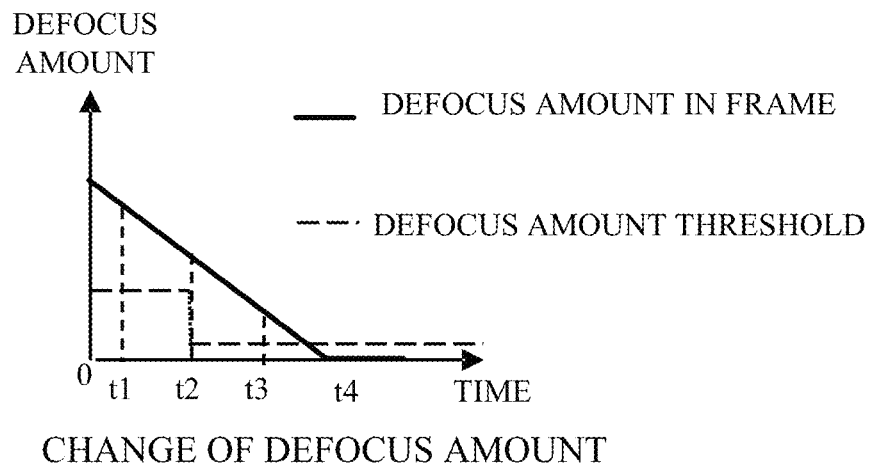
Figure 27F:
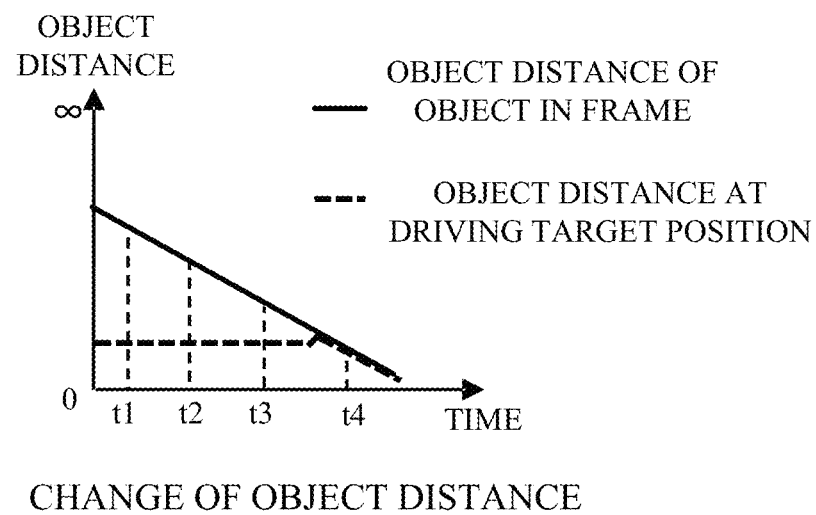

FIGS. 27A to 27C schematically illustrate a state where the object (person) in the focus frame set at the image center is gradually approaching but the AF driving is stopped, and FIG. 27D illustrates that the focus state is switched to the AF driving. At this time, the defocus amount in the focus frame changes as illustrated by the solid line in FIG. 27E, and the defocus amount of the object (person) in the focus frame is larger than the threshold (broken line in FIG. 27E) at times t1 and t2. Thus, as illustrated by the broken line in FIG. 27E the driving target position remains unchanged and the AF driving is stopped.

Next, as it is determined that the object (person) in the focus frame is approaching in the in-focus direction at time t2, the defocus amount threshold (broken line in FIG. 27E) is changed to the defocus amount value corresponding to a value equal to or less than the depth of focus. Thereby, as illustrated in FIG. 27F, the AF driving is stopped even at time t3, and even if the AF driving is started within the threshold, the focus state change is limited to a range within the depth, so a sudden focus change or unintended lens movement such as a multiplication change can be suppressed.

The above configuration can provide a focusing control (autofocus control) for switching between the in-focus driving and the in-focus driving stop, based on the detected defocus amount, and determines whether the object (the imaging object) is moving in the in-focus direction based on the defocus amount change. In addition, this configuration changes, based on the determination result, the defocus amount threshold for shifting from the in-focus driving stop state to the in-focus driving state. Thereby, an unnecessary lens movement can be suppressed, such as a sudden focus change and a multiplication change, in shifting to the in-focus driving state, and the good-quality focusing can be provided in the motion image capturing.

Second Embodiment

Figure 28:
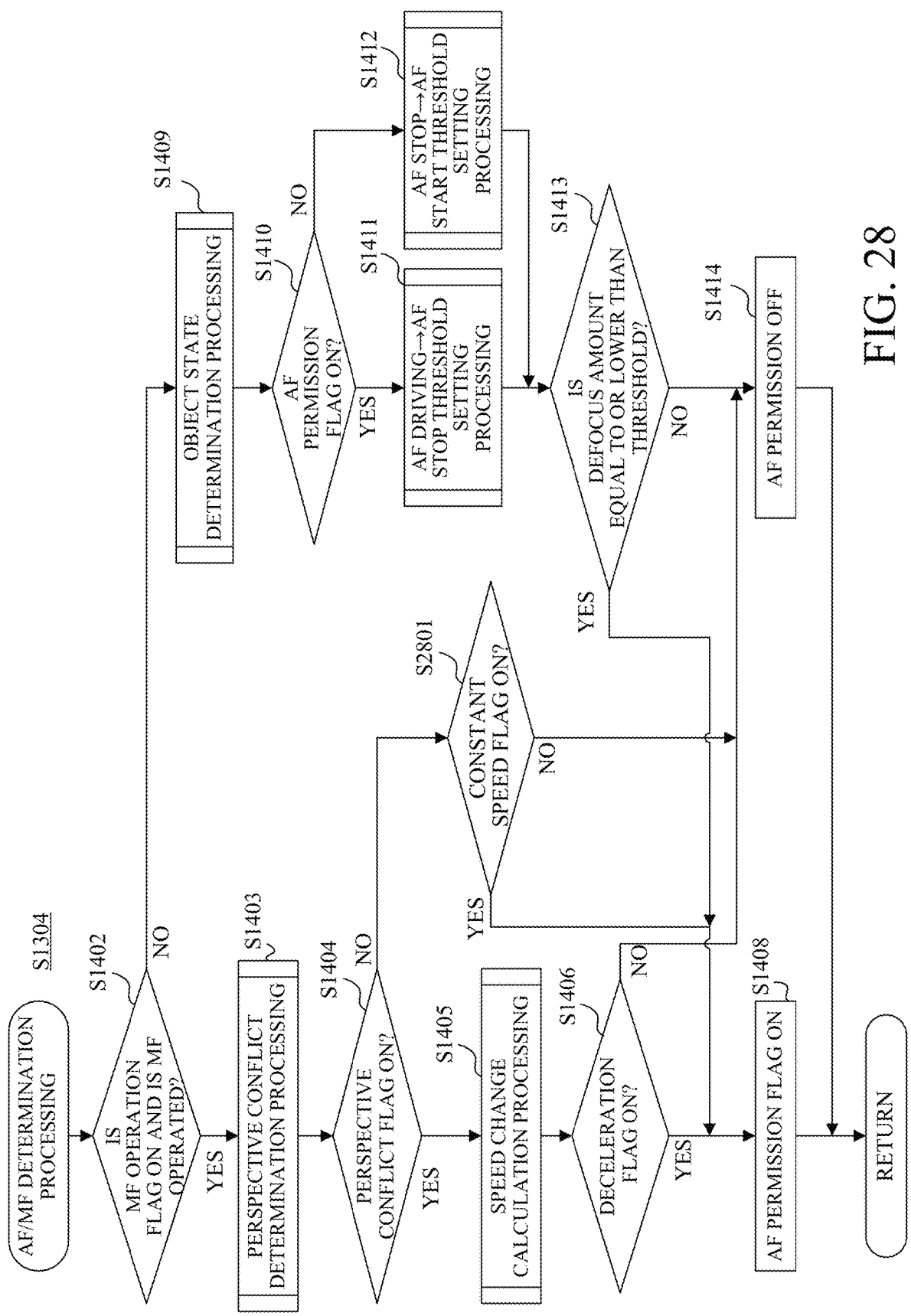
FIG. 28 is a flowchart showing AF/MF determination processing according to a second embodiment.
Figure 29:
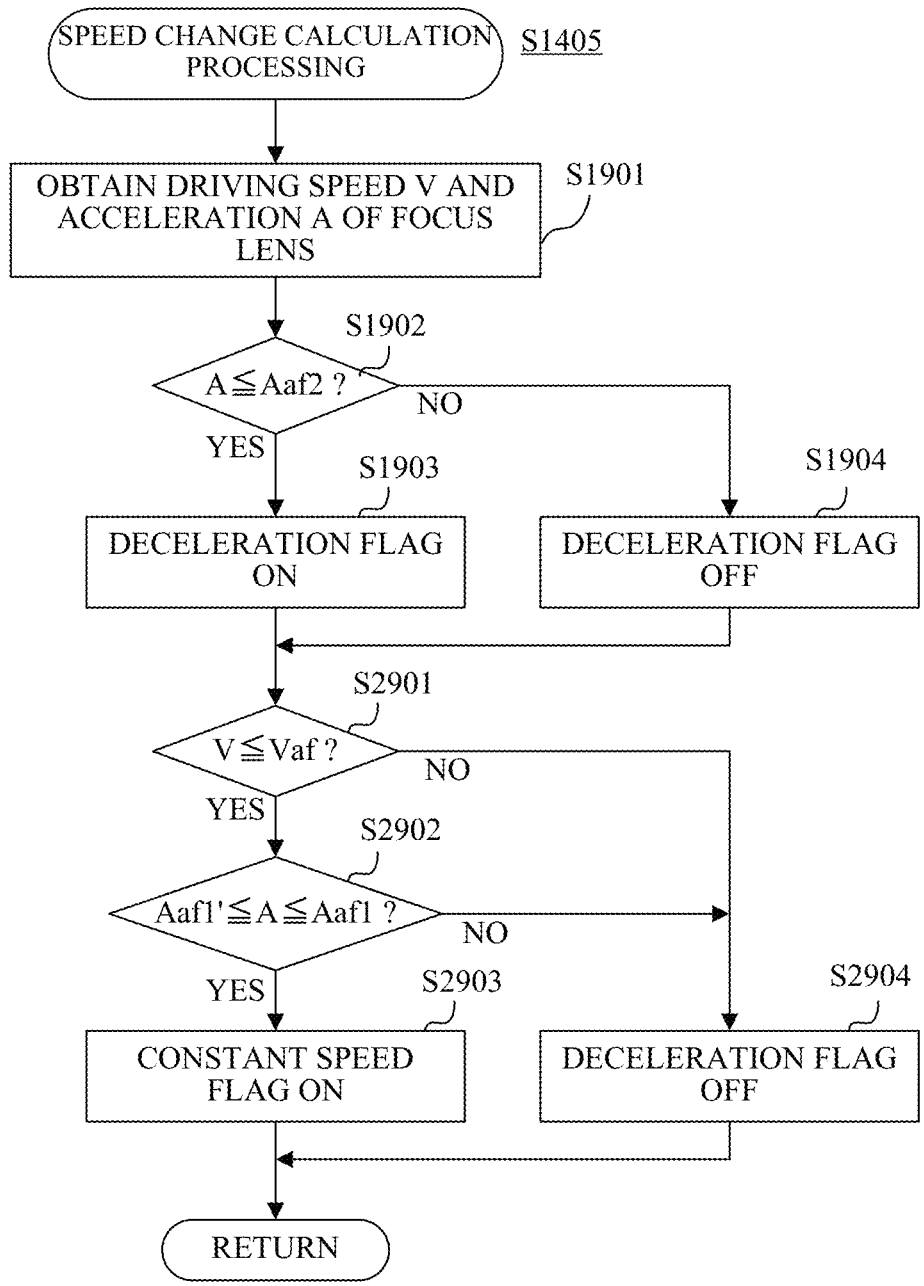
FIG. 29 is a flowchart showing speed change calculation processing according to the second embodiment.

Referring now to FIGS. 28 and 29, a description will be given of a second embodiment according to the present invention. This embodiment is different from the first embodiment in the AF/MF determination processing (step S1304). The other basic configuration and basic operation are the same as those of the first embodiment.

FIG. 28 is a flowchart showing the AF/MF determination processing according to this embodiment. Each step in FIG. 28 is mainly executed by the camera controller 207. This embodiment differs from the first embodiment in having the step S2801 instead of the step S1407.

In the step S2801, the camera controller 207 determines whether the constant speed flag is ON. In other words, the camera controller 207 determines the switching timing from the MF to the AF based on determining whether or not the focus lens has a constant speed. If the constant speed flag is ON in the step S2801, the flow proceeds to the step S1408. In the step S1408, the camera controller 207 sets the AF permission flag to ON and ends the processing. On the other hand, if the constant speed flag is OFF at step S2801, the flow proceeds to the step S1414. In the step S1414, the camera controller 207 sets the AF permission flag to OFF and ends the processing.

Referring now to FIG. 29, a description will be given of the determination of the constant speed flag. FIG. 29 is a flowchart showing the speed change calculation processing according to this embodiment. Each step in FIG. 29 is mainly executed by the camera controller 207. This embodiment is different from the first embodiment in the steps S2901 to S2904 (the constant speed flag determination processing).

In the step S2901, the camera controller 207 determines whether $V \leq Vaf$ is satisfied as illustrated in FIG. 18B. If $V \leq Vaf$ is satisfied, the flow proceeds to the step S2902. On the other hand, if $V \leq Vaf$ is not satisfied, the flow proceeds to the step S2904. In the step S2902, the camera controller 207 determines whether $Aaf1' \leq A \leq Aaf1$ is satisfied as illustrated in FIG. 18C. If $Aaf1' \leq A \leq Aaf1$ is satisfied, the flow proceeds to the step S2903. In the step S2903, the camera controller 207 sets the constant speed flag to ON and ends the processing. On the other hand, if Aaf1'≤A≤Aaf1 is not satisfied, the flow proceeds to the step S2904. In the step S2904, the camera controller 207 sets the constant speed flag to OFF and ends the processing. Thus, the in-focus operation can continue while the focusing speed is maintained for the imaging by the user by detecting the constant speed and by switching the focus mode to the AF.

This embodiment determines whether or not the focus lens has the constant speed (the focus lens has a substantially constant speed), based on whether or not the change amount relating to the speed of the focus lens in the manual focus control falls within a predetermined range. In this embodiment, the change amount relating to the speed of the focus lens is not limited to the speed change amount of the focus lens itself, and may be another change amount, such as a speed change amount of the operation member and a defocus amount change amount.

Third Embodiment

Figure 30:
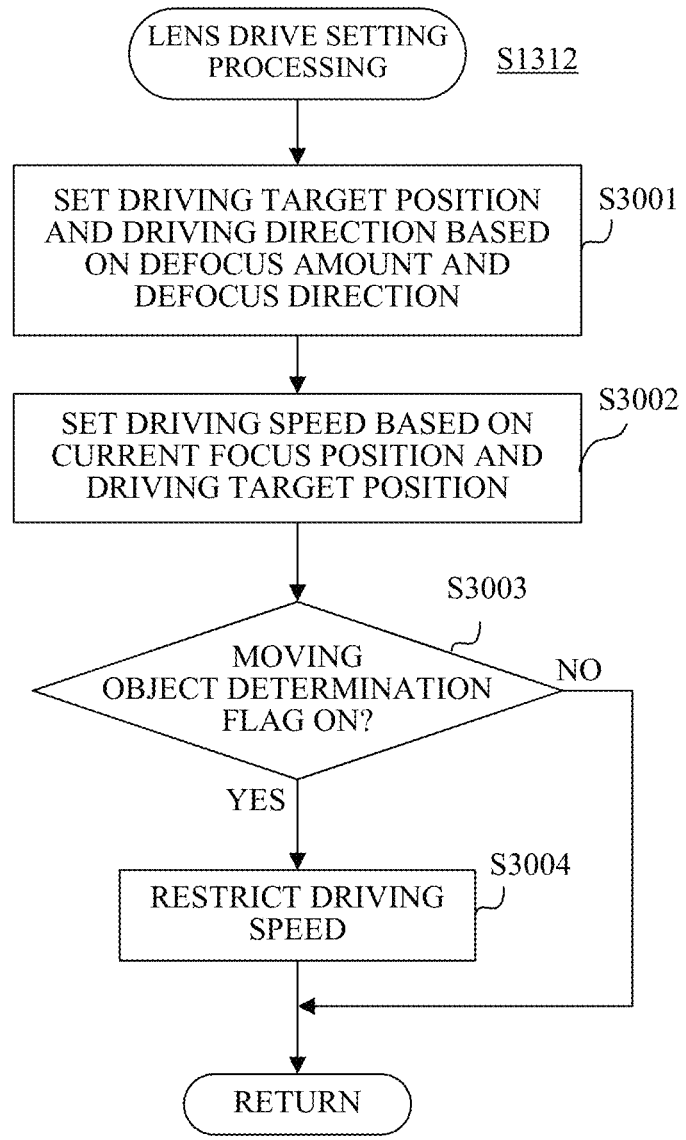
FIG. 30 is a flowchart showing lens drive setting processing according to a third embodiment.
Figure 31:
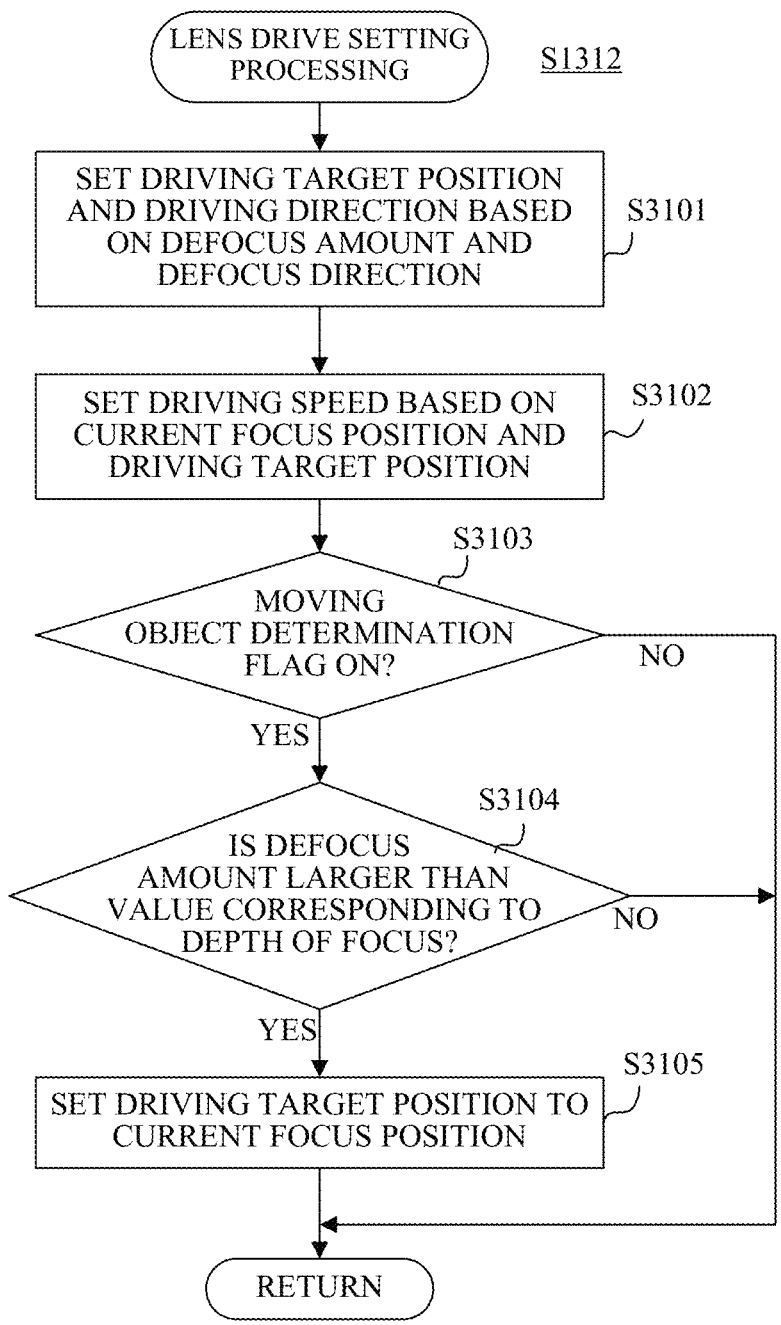
FIG. 31 is a flowchart showing lens drive setting processing as a variation of the third embodiment.

Referring now to FIGS. 30 and 31, a description will be given of a third embodiment according to the present invention. This embodiment differs from the first embodiment in the lens drive setting processing (step S1312) in the stable mode driving processing (step S1004). The other basic configuration and basic operation are the same as those of the first embodiment.

FIG. 30 is a flowchart showing the lens drive setting processing. Each step in FIG. 30 is mainly executed by the camera controller 207. FIG. 30 differs from FIG. 23 described in the first embodiment in that FIG. 30 includes the steps S3003 and S3004. The steps S3001 and S3002 in FIG. 30 are the same as the steps S2301 and S2032 in FIG. 23.

In the step S3003, the camera controller 207 determines whether the moving object determination flag is ON. When the moving object determination flag is OFF (No in the step S3003), the camera controller 207 ends the processing. On the other hand, if the moving object determination flag is ON (Yes in the step S3003), the flow proceeds to the step S3004, and the camera controller 207 restricts the driving speed of the focus lens 103 set in the step S3002 and ends the processing. Herein, the limitation of the driving speed may be set to a low speed that prevents a sudden focus change or a multiplication change from easily recognized, or the AF driving may not be performed by setting the speed to zero.

According to the first embodiment, when the moving object determination flag is ON, the AF stop→AF start threshold setting processing suppresses an unintended lens movement such as a sharp focus change and a multiplication change, by changing the AF stop→AF start threshold to the value of the defocus amount corresponding to the value below the depth of focus. On the other hand, this embodiment suppresses the unintended lens movement by limiting the driving speed of the focus lens 103.

Referring now to FIG. 31, a description will be given of the lens drive setting processing as a variation of this embodiment. FIG. 31 is a flowchart showing the lens drive setting processing as the variation. Each step in FIG. 31 is mainly executed by the camera controller 207.

The steps S3101 to S3103 in FIG. 31 are the same as the steps S3001 to S3003 in FIG. 30, respectively. If the moving object determination flag is OFF in the step S3103 (No in the step S3103), the camera controller 207 ends the processing. On the other hand, if the moving object determination flag is ON (Yes in the step S3103), the flow proceeds to the step S3104.

In the step S3104, the camera controller 207 determines whether the defocus amount is larger than a value corresponding to the depth of focus. If the defocus amount is equal to or less than the value corresponding to the depth of focus (No in the step S3104), the camera controller 207 ends the processing. On the other hand, if the defocus amount is larger than the value corresponding to the depth of focus (Yes in the step S3104), the flow proceeds to the step S3105.

In the step S3105, the camera controller 207 sets the driving target position of the focus lens 103 set in the step S3101 to the current position of the focus lens 103 (current focus position), and ends the processing. Thus, this variation fixes the driving target position at the current focus position until the defocus amount becomes smaller than the value corresponding to the depth of focus, restricts the driving of the focus lens 103 and suppresses the unintentional movement of the lens. Instead of setting the driving target position to the current focus position in the step S3105, this variation may compare the driving direction set in the step S3101 with the movement direction of the object, and prohibit the AF driving when these directions do not accord with each other.

This embodiment controls focusing to switch between the in-focus driving and the in-focus driving stop based on the detected defocus amount, and determines whether the captured object moves in the in-focus direction based on the defocus amount change. Then, the unintended lens movement such as a sudden focus change and a multiplication change can be suppressed by restricting the driving speed and driving direction in the in-focus driving or the in-focus driving itself based on the determination result, and the good-quality focusing can be provided in the motion image capturing.

Thus, in each embodiment, the control apparatus includes the focus detector (AF signal processor 204) and the controller (camera controller 207). The focus detector detects the defocus amount based on the phase difference between a pair of image signals generated based on the light beams having passed through different pupil areas in the imaging optical system. The controller controls the focus lens 103 in the imaging optical system. The controller can perform the autofocus control (AF control) based on the defocus amount detected by the focus detector, and the manual focus control (MF control) based on the operation of the user via the operation member (lens operation unit 107). The controller performs the autofocus control when the change amount relating to the speed of the focus lens in the manual focus control falls within a predetermined range (or when it is determined that the focus lens has a substantially constant speed) (S1405, S2901 to S2904). The change amount relating to the speed of the focus lens may be a change amount of the speed of the operation member, a change amount of the speed of the focus lens, or a change amount of the defocus amount.

The focus detector detects the defocus amount in each of a plurality of focus detection areas (on the image sensor 201). The controller determines, based on the defocus amount detected in each of the plurality of focus detection areas, whether or not there are perspective conflicting objects. The controller changes the transfer condition from the manual focus control to the autofocus control in accordance with whether or not there are perspective conflicting objects (S1403). The controller may determine whether or not there are perspective conflicting objects, based on the area of the focus detection area (S1403). The controller may transfer from the manual focus control to the autofocus control when there are perspective conflict objects and the change amount relating to the speed of the focus lens reduces beyond a predetermined range. On the other hand, the controller transfers from the manual focus control to the autofocus control when there are no perspective conflicting objects and the change amount relating to the speed of the focus lens falls within the predetermined range (S1034). The controller may transfer from the manual focus control to the autofocus control when there are no perspective conflicting objects and the defocus amount falls within the predetermined depth range (S1304).

Thus, each embodiment can provide a control apparatus enabling a smooth focus state change in the manual focusing.

The 4K resolution motion image capturing has recently been spread and a higher focusing accuracy is required, but it is difficult for the user to visually determine the in-focus position. In the AF control in the motion image capturing, in addition to the responsiveness for quick focusing, the quality of the focusing operation is required. Accordingly, one known high-quality focus control method uses the focus detection result by the imaging plane phase difference AF method, stops the AF driving when the position is distant from the in-focus position to promote the MF focusing operation by the user, and performs the AF driving only near the in-focus position. However, for example, a high-quality focusing control is unavailable in a transfer from the AF driving stop state to the AF driving state in a scene where the focus is fixed on the certain object distance, the object gradually approaches from a blurred state, and the in-focus state is obtained.

Accordingly, in each embodiment, the control apparatus includes a focus detector (AF signal processor 204), a controller (camera controller 207), and a memory (internal memory in the camera controller 207 etc.). The focus detector detects the defocus amount based on the phase difference between a pair of image signals generated based on the light beams having passed through different pupil areas in the imaging optical system. The controller controls the focus lens in the imaging optical system based on the defocus amount. The memory stores a history of defocus amounts. The controller determines whether the object is moving in the in-focus direction based on the change in the history of the defocus amount. The controller changes the control parameter for controlling the focus lens based on whether the object is moving in the in-focus direction (S1409).

The control parameter may include a threshold of the defocus amount for determining whether to perform or stop the control of the focus lens based on the defocus amount. The controller sets a first threshold to the threshold of the defocus amount when the object is not moving in the in-focus direction. On the other hand, when the object is moving in the in-focus direction, the controller sets a second threshold smaller than the first threshold to the threshold of the defocus amount (S2502, S2503). If the object is moving in the in-focus direction, the controller sets the threshold of the defocus amount equal to or less than the value corresponding to the depth of focus (S2502, S2503).

The control parameter may include the speed of the focus lens. The controller sets a first speed to the speed of the focus lens when the object is not moving in the in-focus direction. On the other hand, when the object is moving in the in-focus direction, the controller sets a second speed lower than the first speed to the speed of the focus lens (S3003, S3004). The control parameter includes the driving direction of the focus lens. The controller stops controlling the focus lens based on the defocus amount when the driving direction of the focus lens does not accord with the movement direction of the object when the object is moving in the in-focus direction (S3105).

When the defocus amount is continuously reducing for a predetermined period, the controller determines that the object is moving in the in-focus direction (S2406, S2407). The controller does not change the control parameter based on whether the object is moving or not in the manual focus control based on the operation of the user through the operation member (FIGS. 15A-15C and 18A-18C).

Thereby, each embodiment can suppress the unintended lens movement such as a sudden focus change or a multiplication change, in transferring from the in-focus driving stop state to the in-focus state and can realize high-quality imaging.

For example, if a transition range from the MF to the AF is widely set, switching from the MF to the AF is smooth but the focus may shift to a close object when the AF driving is continuing near the in-focus state. On the other hand, if the transition range from the MF to the AF is narrowly set, the focus shift to a close object can be prevented, but smooth switching from the MF to the AF becomes difficult.

In each embodiment, the control apparatus includes the focus detector (AF signal processor 204) and the controller (camera controller 207). The focus detector detects the defocus amount based on the phase difference between a pair of image signals generated based on the light beams having passed through different pupil areas in the imaging optical system. The controller controls the focus lens in the imaging optical system. The controller can perform the autofocus control based on the defocus amount detected by the focus detector, and the manual focus control based on the operation of the user via the operation member (lens operation unit 107). The controller sets the first defocus amount threshold when there is no user operation via the operation member, and a second defocus amount threshold larger than the first defocus amount threshold when there is a user operation via the operation member (S1407, S1412). The controller sets a first defocus amount threshold based on the depth of focus (S2503).

The controller may determine whether the visibility of the object is good, based on a predetermined condition. The controller sets the second defocus amount threshold when it is determined that the visibility is good, and sets a third defocus amount threshold larger than the second defocus amount threshold when it is determined that the visibility is not good (S2002 to S2005). The predetermined condition may include the focal length, and the controller may determine that the visibility is not good when the focal length is shorter than the predetermined focal length. The predetermined condition includes an aperture value (F-number), and the controller determines that the visibility is not good when the F-number is larger than a predetermined F-number (when the diaphragm is narrowed). The predetermined condition may include the object distance, and the controller may determine that the visibility is not good when the object distance is longer than the predetermined object distance. The predetermined condition may include the depth of field, and the controller may determine that the visibility is not good when the depth of field is deeper than a predetermined depth of field. The predetermined condition may include a gain of the image sensor, and the controller may determine that the visibility is not good when the gain is higher than a predetermined gain. The predetermined condition may include an S/N ratio of an object area, and the controller may determine that the visibility is not good when the S/N ratio of the object area is lower than a predetermined S/N ratio.

The predetermined condition may include a contrast of the object area, and the controller may determine that the visibility is not good when the contrast of the object area is lower than a predetermined contrast.

When the second defocus amount threshold or the third defocus amount threshold may be set, the controller may not change the second defocus amount threshold or the third defocus amount threshold until the in-focus state is obtained. The controller may determine whether or not the object is changed based on a predetermined determination condition, and sets a fourth defocus amount larger than the first defocus amount threshold when the object is changed (S2202, S2203, S2205). The predetermined determination condition may include panning, and the controller may determine that the object has been changed when the panning is detected (S2202). The predetermined determination condition may include a movement of an AF frame, and the controller may determine that the object is changed when the movement of the AF frame is detected (S2202). The predetermined determination condition may include a zoom operation, and the controller may determine that the object has been changed when the zoom operation is detected (S2202).

Thus, each embodiment can smoothly transfer from the MF control to the AF control and suppress a switch of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, an imaging apparatus, and a storage medium (or program), which can realize a smooth focus state change in manual focusing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-104017, filed on May 30, 2018, which is hereby incorporated by reference herein in its entirety.

What is claimed is:

1. A control apparatus comprising:
a focus detector configured to detect a defocus amount based on a phase difference between a pair of image signals generated based on light beams having passed through mutually different pupil areas in an imaging optical system; and
a controller configured to control a focus lens in the imaging optical system,
wherein the focus detector detects the defocus amount in each of a plurality of focus detection areas,
wherein the controller is configured to perform an autofocus control based on the defocus amount detected by the focus detector, and a manual focus control based on an operation of a user via an operation member,
wherein the controller performs the autofocus control when a change amount relating to a speed of the focus lens in the manual focus control falls within a predetermined range,
wherein the controller determines whether or not there are perspectively conflicting objects, based on the defocus amount detected in each of the plurality of focus detection areas, and
wherein a transfer condition from the manual focus control to the autofocus control is changed according to whether or not there are perspectively conflicting objects.

2. The control apparatus according to claim 1, wherein the change amount relating to the speed of the focus lens includes one of a change amount of a speed of the operation member, a change amount of the speed of the focus lens, and a change amount of the defocus amount.

3. The control apparatus according to claim 1, wherein the controller transfers from the manual focus control to the autofocus control when a size of the focus detection area is a first size and the change amount related to the speed of the focus lens reduces beyond the predetermined range, and
wherein the controller transfers from the manual focus control to the autofocus control when the size of the focus detection area is a second size smaller than the first size, and the change amount relating to the speed of the focus lens falls within the predetermined range.

4. The control apparatus according to claim 1, wherein the controller transfers from the manual focus control to the autofocus control when a size of the focus detection area is a first size and the change amount related to the speed of the focus lens reduces beyond the predetermined range, and
wherein the controller transfers from the manual focus control to the autofocus control when the size of the focus detection area is a second size smaller than the first size and the defocus amount falls within a predetermined depth range.

5. A control apparatus comprising:
a focus detector configured to detect a defocus amount based on a phase difference between a pair of image signals generated based on light beams having passed through mutually different pupil areas in an imaging optical system; and
a controller configured to control a focus lens in the imaging optical system based on the defocus amount; and
a memory configured to store a history of the defocus amount, wherein the controller determines whether an object is moving in an in-focus direction, based on a change in the history of the defocus amount, and wherein the controller changes a control parameter in controlling the focus lens based on whether or not the object is moving in the in-focus direction, wherein the control parameter includes a threshold of the defocus amount for determining whether to perform or stop a control of the focus lens based on the defocus amount, and wherein the controller sets a first threshold to the threshold of the defocus amount when the object is not moving in the in-focus direction, and sets a second threshold smaller than the first threshold to the threshold of the defocus amount when the object is moving in the in-focus direction.

6. The control apparatus according to claim 5, wherein the controller sets the threshold of the defocus amount to a value equal to or lower than a value corresponding to a depth of focus when the object is moving in the in-focus direction.

7. The control apparatus according to claim 5, wherein the control parameter includes a speed of the focus lens, and wherein the controller sets a first speed to the speed of the focus lens when the object is not moving in the in-focus direction, and sets a second speed lower than the first speed to the speed of the focus lens when the object is moving in the in-focus direction.

8. The control apparatus according to claim 5, wherein the control parameter includes a driving direction of the focus lens, and wherein the controller stops controlling the focus lens based on the defocus amount when the driving direction of the focus lens does not accord with a moving direction of the object and the object is moving in the in-focus direction.

9. The control apparatus according to claim 5, wherein the controller determines that the object is moving in the in-focus direction when the defocus amount continues to decrease for a predetermined period.

10. The control apparatus according to claim 5, wherein the controller does not change the control parameter based on whether or not the object is moving, in a manual focus control based on an operation of a user via an operation member.

11. A control apparatus comprising:
a focus detector configured to detect the defocus amount based on a phase difference between a pair of image signals generated based on light beams having passed through mutually different pupil areas in the imaging optical system; and
a controller configured to control a focus lens in the imaging optical system,
wherein the controller is configured to perform an autofocus control based on the defocus amount detected by the focus detector, and a manual focus control based on an operation of a user via an operation member, and
wherein the controller sets a first defocus amount threshold when there is no operation of the user via the operation member, and sets a second defocus amount threshold larger than the first defocus amount threshold when there is an operation of the user via the operation member, the first defocus threshold and the second defocus amount threshold being used to determine whether to perform or stop a control of the focus lens based on the defocus amount.

12. The control apparatus according to claim 11, wherein the controller sets the first defocus amount threshold based on a depth of focus.

13. The control apparatus according to claim 11, wherein the controller determines whether an object has a good visibility, based on a predetermined condition, sets the second defocus amount threshold when determining that the object has the good visibility, and sets a third defocus amount threshold larger than the second defocus amount threshold when determining that the object does not have the good visibility.

14. The control apparatus according to claim 13, wherein the predetermined condition includes a focal length, and wherein the controller determines that the object does not have the good visibility when the focal length is shorter than a predetermined focal length.

15. The control apparatus according to claim 13, wherein the predetermined condition includes an F-number, and wherein the controller determines that the object does not have the good visibility when the F-number is larger than a predetermined F-number.

16. The control apparatus according to claim 13, wherein the predetermined condition includes an object distance, and wherein the controller determines that the object does not have the good visibility when the object distance is longer than a predetermined object distance.

17. The control apparatus according to claim 13, wherein the predetermined condition includes a depth of field, and wherein the controller determines that the object does not have the good visibility when the depth of field is deeper than a predetermined depth of field.

18. The control apparatus according to claim 13, wherein the predetermined condition includes a gain of the imaging apparatus, and wherein the controller determines that the object does not have the good visibility when the gain is higher than a predetermined gain.

19. The control apparatus according to claim 13, wherein the predetermined condition includes a S/N ratio of an object area, and wherein the controller determines that the object does not have the good visibility when the S/N ratio of the object area is lower than a predetermined S/N ratio.

20. The control apparatus according to claim 13, wherein the predetermined condition includes a contrast of an object area, and wherein the controller determines that the object does not have the good visibility when the contrast of the object area is lower than a predetermined contrast.

21. The control apparatus according to claim 13, wherein the controller does not change one of the second defocus amount threshold and the third defocus amount threshold until an in-focus state is obtained once setting the one of second defocus amount threshold and the third defocus amount threshold.

22. The control apparatus according to claim 1, wherein the controller determines whether an object has been changed, based on a predetermined determination condition, and sets a fourth defocus amount threshold larger than the first defocus amount threshold when determining that the object has been changed.

23. The control apparatus according to claim 22, wherein the predetermined determination condition includes panning, and wherein the controller determines that the object has been changed when detecting the panning.

24. The control apparatus according to claim 22, wherein the predetermined determination condition includes a movement of an autofocus frame, and
wherein the controller determines that the object has been changed when detecting the movement of the autofocus frame.

25. The control apparatus according to claim 22, wherein the predetermined determination condition includes a zoom operation, and
wherein the controller determines that the object has been changed when detecting the zoom operation.

26. An imaging apparatus comprising:
an image sensor configured to photoelectrically convert an optical image formed through an imaging optical system; and
a control apparatus,
wherein the control apparatus includes:
a focus detector configured to detect a defocus amount based on a phase difference between a pair of image signals generated based on light beams having passed through mutually different pupil areas in an imaging optical system; and
a controller configured to control a focus lens in the imaging optical system,
wherein the focus detector detects the defocus amount in each of a plurality of focus detection areas,
wherein the controller is configured to perform an autofocus control based on the defocus amount detected by the focus detector, and a manual focus control based on an operation of a user via an operation member,
wherein the controller performs the autofocus control when a change amount relating to a speed of the focus lens in the manual focus control falls within a predetermined range,
wherein the controller determines whether or not there are perspectively conflicting objects, based on the defocus amount detected in each of the plurality of focus detection areas, and
wherein a transfer condition from the manual focus control to the autofocus control is changed according to whether or not there are perspectively conflicting object.

27. An imaging apparatus comprising:
an image sensor configured to photoelectrically convert an optical image formed through an imaging optical system; and
a control apparatus,
wherein the control apparatus includes:
a focus detector configured to detect a defocus amount based on a phase difference between a pair of image signals generated based on light beams having passed through mutually different pupil areas in an imaging optical system; and
a controller configured to control a focus lens in the imaging optical system based on the defocus amount; and
a memory configured to store a history of the defocus amount,
wherein the controller determines whether an object is moving in an in-focus direction, based on a change in the history of the defocus amount,
wherein the controller changes a control parameter in controlling the focus lens based on whether or not the object is moving in the in-focus direction,
wherein the control parameter includes a threshold of the defocus amount for determining whether to perform or stop a control of the focus lens based on the defocus amount, and
wherein the controller sets a first threshold to the threshold of the defocus amount when the object is not moving in the in-focus direction, and sets a second threshold smaller than the first threshold to the threshold of the defocus amount when the object is moving in the in-focus direction.

28. An imaging apparatus comprising:
an image sensor configured to photoelectrically convert an optical image formed through an imaging optical system; and
a control apparatus,
wherein the control apparatus includes:
a focus detector configured to detect the defocus amount based on a phase difference between a pair of image signals generated based on light beams having passed through mutually different pupil areas in the imaging optical system; and
a controller configured to control a focus lens in the imaging optical system,
wherein the controller is configured to perform an autofocus control based on the defocus amount detected by the focus detector, and a manual focus control based on an operation of a user via an operation member, and
wherein the controller sets a first defocus amount threshold when there is no operation of the user via the operation member, and sets a second defocus amount threshold larger than the first defocus amount threshold when there is an operation of the user via the operation member.

29. A non-transitory computer-readable storage medium storing a program that causes a computer to execute a method,
wherein the method comprises the steps of:
detecting a defocus amount based on a phase difference between a pair of image signals generated based on light beams having passed through mutually different pupil areas in an imaging optical system; and
controlling a focus lens in the imaging optical system,
wherein the detecting step detects the defocus amount in each of a plurality of focus detection areas,
wherein the controlling step is configured to perform an autofocus control based on the defocus amount detected in the detecting step, and a manual focus control based on an operation of a user via an operation member,
wherein the controlling step performs the autofocus control when a change amount relating to a speed of the focus lens in the manual focus control falls within a predetermined range,
wherein the controlling step determines whether or not there are perspectively conflicting objects, based on the defocus amount detected in each of the plurality of focus detection areas, and
wherein a transfer condition from the manual focus control to the autofocus control is changed according to whether or not there are perspectively conflicting objects.

30. A non-transitory computer-readable storage medium storing a program that causes a computer to execute a method,
wherein the method comprises the steps of:
detecting a defocus amount based on a phase difference between a pair of image signals generated based on light beams having passed through mutually different pupil areas in an imaging optical system; and controlling a focus lens in the imaging optical system based on the defocus amount; and wherein the controlling step determines whether an object is moving in an in-focus direction, based on a change in the history of the defocus amount stored in a memory, and wherein the controlling step changes a control parameter in controlling the focus lens based on whether or not the object is moving in the in-focus direction, wherein the control parameter includes a threshold of the defocus amount for determining whether to perform or stop a control of the focus lens based on the defocus amount, and wherein the controlling step sets a first threshold to the threshold of the defocus amount when the object is not moving in the in-focus direction, and sets a second threshold smaller than the first threshold to the threshold of the defocus amount when the object is moving in the in-focus direction.

31. A non-transitory computer-readable storage medium storing a program that causes a computer to execute a method, wherein the method comprises the steps of:

detecting the defocus amount based on a phase difference between a pair of image signals generated based on light beams having passed through mutually different pupil areas in the imaging optical system; and controlling a focus lens in the imaging optical system, wherein the controlling step is configured to perform an autofocus control based on the defocus amount detected by the focus detector, and a manual focus control based on an operation of a user via an operation member, and wherein the controlling step sets a first defocus amount threshold when there is no operation of the user via the operation member, and sets a second defocus amount threshold larger than the first defocus amount threshold when there is an operation of the user via the operation member.

* * * * *